United States Patent
John et al.

(10) Patent No.: US 12,376,017 B2
(45) Date of Patent: Jul. 29, 2025

(54) METHODS AND APPARATUS FOR TRANSPORT CONTEXT TRANSLATION

(71) Applicant: Huawei Technologies Co., Ltd., Shenzhen (CN)

(72) Inventors: Kaippallimalil Mathew John, Carrollton, TX (US); Uma S. Chunduri, Fremont, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 631 days.

(21) Appl. No.: 17/728,429

(22) Filed: Apr. 25, 2022

(65) Prior Publication Data

US 2022/0248321 A1    Aug. 4, 2022

Related U.S. Application Data

(63) Continuation of application No. PCT/US2020/044289, filed on Jul. 30, 2020.
(Continued)

(51) Int. Cl.
| | |
|---|---|
| H04L 1/00 | (2006.01) |
| H04L 41/0895 | (2022.01) |
| H04L 69/164 | (2022.01) |
| H04W 28/02 | (2009.01) |
| H04W 48/18 | (2009.01) |

(52) U.S. Cl.
CPC ......... H04W 48/18 (2013.01); H04L 41/0895 (2022.05); H04L 69/164 (2013.01); H04W 28/0268 (2013.01)

(58) Field of Classification Search
CPC .............. H04W 48/18; H04W 28/0268; H04L 41/0895; H04L 69/164; H04L 41/122; H04L 41/40; H04L 41/5048
See application file for complete search history.

(56) References Cited

U.S. PATENT DOCUMENTS

| | | | | |
|---|---|---|---|---|
| 2019/0182211 A1* | 6/2019 | Yang | ...................... | H04L 69/326 |
| 2022/0150691 A1* | 5/2022 | Teyeb | ................... | H04L 63/123 |
| 2024/0073775 A1* | 2/2024 | Kim | ...................... | H04W 40/04 |

FOREIGN PATENT DOCUMENTS

EP    3113539 A1 *    1/2017

OTHER PUBLICATIONS

Softbank Corp., "Pseudo-CR on Note for NR Key Issue," Agenda Item 6.1.1, 3GPP TSG-CT WG4 Meeting #91 C4-192153, Reno, Nevada, May 13-17, 2018, 2 pages.
(Continued)

*Primary Examiner* — Rebecca E Song
*Assistant Examiner* — Hidayat Dabiri
(74) *Attorney, Agent, or Firm* — Slater Matsil, LLP

(57) ABSTRACT

A method for resolving an identifier of a path between a first user plane entity (UPE) and a second UPE includes receiving a translation request comprising a network slice selection assistance information (S-NSSAI), a first transport interface address, a second transport interface address, and one or more quality of service (QoS) parameters associated with the transport path between the first UPE and the second UPE; selecting the identifier of the transport path from a translation table in accordance with the S-NSSAI, the first transport interface address and the second transport interface address; and sending a translation response comprising an indicator of the identifier.

30 Claims, 9 Drawing Sheets

Related U.S. Application Data

(60) Provisional application No. 62/925,481, filed on Oct. 24, 2019.

(56) References Cited

OTHER PUBLICATIONS

Miyasaka, T., et al., "Analysis and Problem Statements for Interworking between 5G Network Slicing and Transport Network draft-mink-5g-ns-transport-ps-00," https://tools.ietf.org/html/draft-mink-5g-ns-transport-ps-00, Jun. 26, 2018, 16 pages.

* cited by examiner

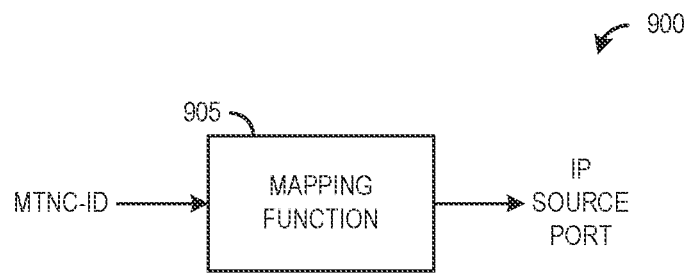
Fig. 9
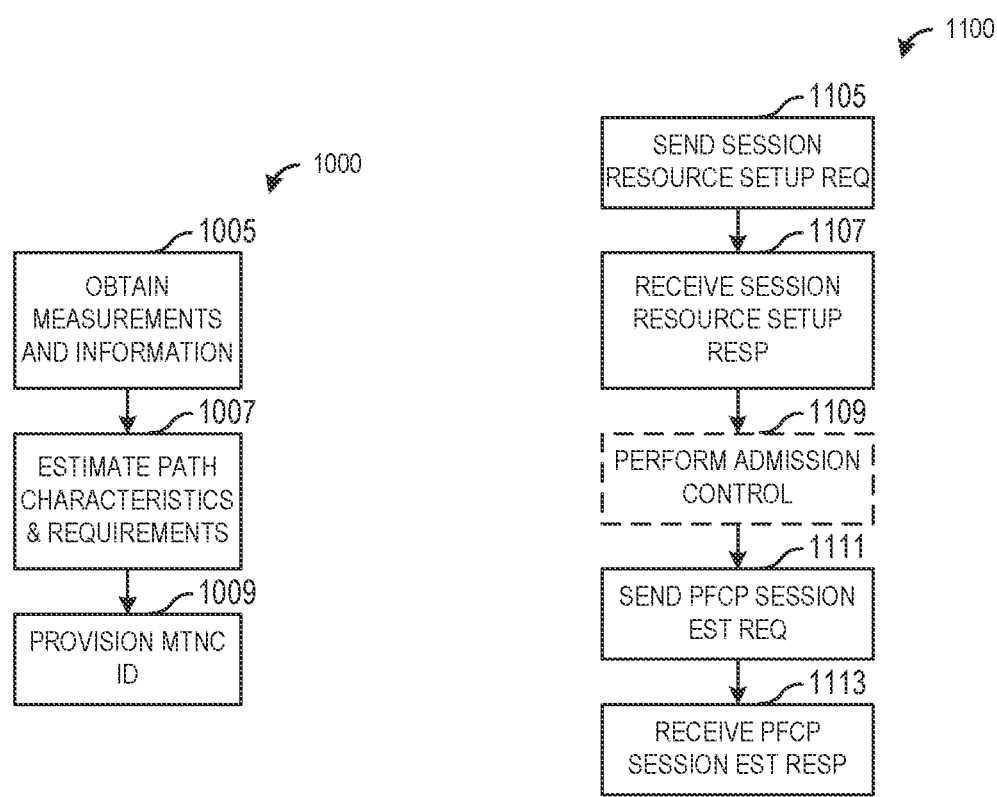
Fig. 10
Fig. 11A

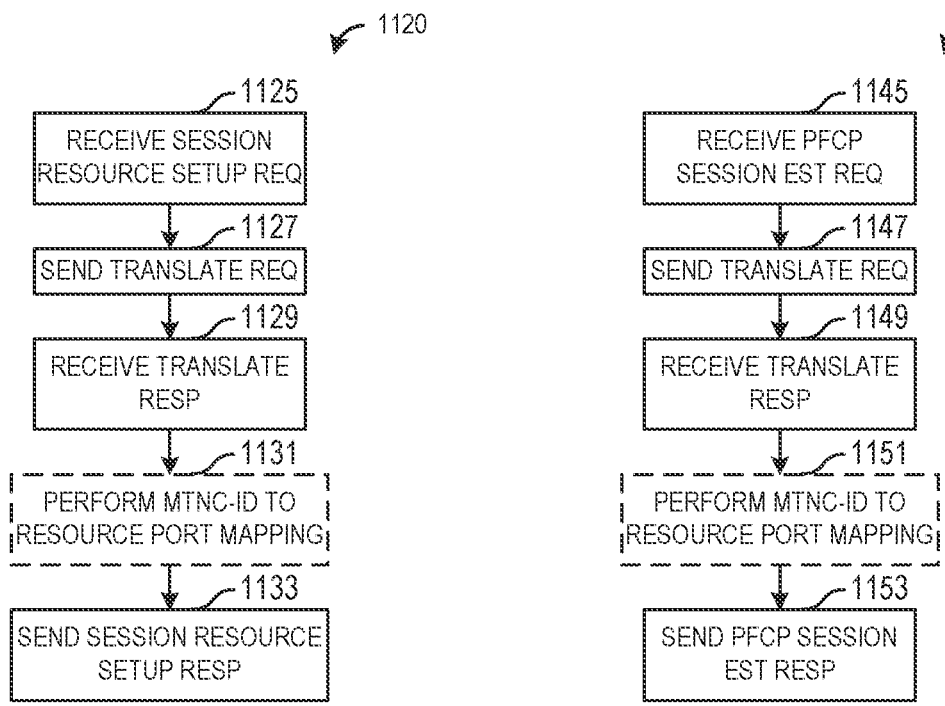
*Fig. 11B*
*Fig. 11C*
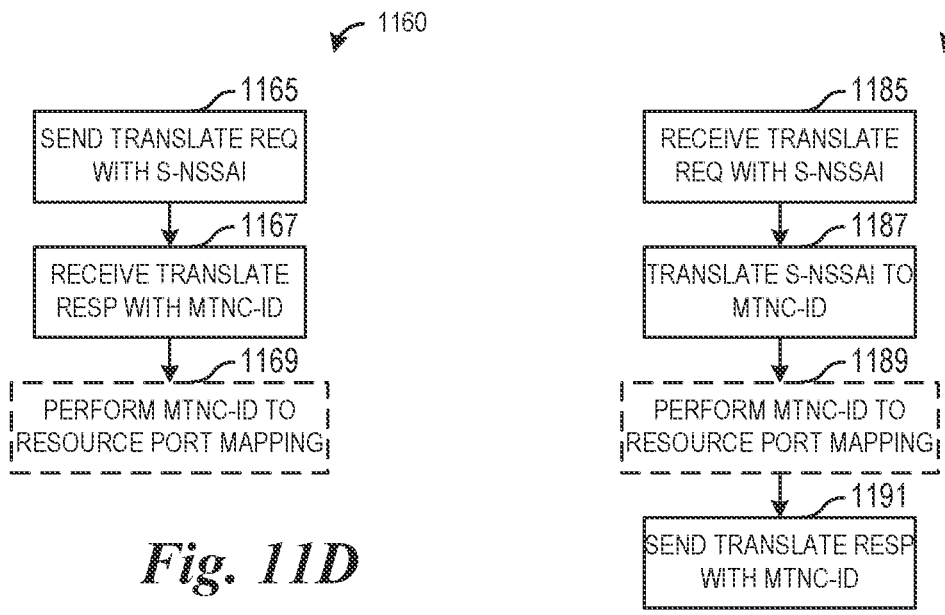
*Fig. 11D*
*Fig. 11E*

METHODS AND APPARATUS FOR TRANSPORT CONTEXT TRANSLATION

CROSS-REFERENCE TO RELATED APPLICATIONS

This application is a continuation of and claims the benefit of priority to PCT/US2020/044289, filed Jul. 30, 2020, entitled "Methods and Apparatus for Transport Context Translation," which claims the benefit of priority to U.S. Provisional Application No. 62/925,481, filed on Oct. 24, 2019, entitled "System and Method for Transport Context Translation," each of which is hereby incorporated herein by reference in its entirety.

TECHNICAL FIELD

The present disclosure relates generally to methods and apparatus for digital communications, and, in particular embodiments, to methods and apparatus for transport context translation.

BACKGROUND

Traffic engineered (TE) mobile network backhauls use provisioning based on, more or less, static engineering estimates. These estimates may be changed, and traffic engineering may be configured periodically based on demand and other performance criteria. However, such a traffic engineering process may take a long time (e.g., on the order of weeks or months), and thus may not be suitable for networks having dynamically changing contexts, such as the fifth generation (5G) mobile networks. It is desirable to provide dynamically traffic engineered paths in backhaul networks to meet the need of changing traffic demands.

SUMMARY

According to a first aspect, a method for resolving an identifier of a transport path between a first user plane entity (UPE) and a second UPE is provided. The method comprising: receiving, by a network function, from a front end entity, a translation request comprising a network slice selection assistance information (S-NSSAI), a first transport interface address, a second transport interface address, and one or more quality of service (QoS) parameters associated with the transport path between the first UPE and the second UPE; selecting, by the network function, the identifier of the transport path from a translation table in accordance with the S-NSSAI, the first transport interface address and the second transport interface address; and sending, by the network function, to the front end entity, a translation response comprising an indicator of the identifier.

In a first implementation form of the method according to the first aspect, the indicator comprising the identifier of the transport path.

In a second implementation form of the method according to the first aspect or any preceding implementation form of the first aspect, the indicator comprising a user datagram protocol (UDP) source port.

In a third implementation form of the method according to the first aspect or any preceding implementation form of the first aspect, further comprising mapping, by the network function, the identifier of the transport path to the UDP source port in accordance with a mapping function the mapping function distributing the identifier of the transport path to one of a plurality of UDP source port ranges to balance network load.

In a fourth implementation form of the method according to the first aspect or any preceding implementation form of the first aspect, the translation response further comprising a duration time value specifying a validity interval associated with the identifier.

In a fifth implementation form of the method according to the first aspect or any preceding implementation form of the first aspect, the first UPE being an access node, and the first transport interface address comprising an Internet Protocol (IP) address of the access node and the second transport interface address comprising an IP address of the second UPE, and the translation response being sent to the access node.

In a sixth implementation form of the method according to the first aspect or any preceding implementation form of the first aspect, the second UPE being an access node, and the first transport interface address comprising an IP address of the first UPE and the second transport interface address comprising an IP address of the access node, and the translation response being sent to the first UPE.

In a seventh implementation form of the method according to the first aspect or any preceding implementation form of the first aspect, the translation request further comprising a subscription indicator.

In an eighth implementation form of the method according to the first aspect or any preceding implementation form of the first aspect, the one or more QoS parameters comprising at least one of path bandwidth, path latency, path priority, or path protection.

In a ninth implementation form of the method according to the first aspect or any preceding implementation form of the first aspect, the network function comprising a transport network function.

In a tenth implementation form of the method according to the first aspect or any preceding implementation form of the first aspect, the front end entity comprising a transport network function front end entity.

According to a second aspect, a network function is provided. The network function comprising: one or more processors; and a non-transitory memory storage comprising instructions that, when executed by the one or more processors, cause the network function to: receive, from a front end entity, a translation request comprising a S-NSSAI, a first transport interface address, a second transport interface address, and one or more QoS parameters associated with a transport path between a first UPE and a second UPE; select an identifier of the transport path from a translation table in accordance with the S-NSSAI, the first transport interface address and the second transport interface address; and send, to the front end entity, a translation response comprising an indicator of the identifier.

In a first implementation form of the network function according to the second aspect, the indicator comprising the identifier of the transport path.

In a second implementation form of the network function according to the second aspect or any preceding implementation form of the second aspect, the indicator comprising a UDP source port.

In a third implementation form of the network function according to the second aspect or any preceding implementation form of the second aspect, the instructions further causing the network function to map the identifier of the transport path to the UDP source port in accordance with a mapping function, the mapping function distributing the identifier of the transport path to one of a plurality of UDP source port ranges to balance network load.

In a fourth implementation form of the network function according to the second aspect or any preceding implementation form of the second aspect, the first UPE being an access node, and the first transport interface address comprising an IP address of the access node and the second transport interface address comprising an IP address of the second UPE, and the translation response being sent to the access node.

In a fifth implementation form of the network function according to the second aspect or any preceding implementation form of the second aspect, the second UPE being an access node, and the first transport interface address comprising an IP address of the first UPE and the second transport interface address comprising an IP address of the access node, and the translation response being sent to the first UPE.

In a sixth implementation form of the network function according to the second aspect or any preceding implementation form of the second aspect, the translation request further comprising a subscription indicator.

In a seventh implementation form of the network function according to the second aspect or any preceding implementation form of the second aspect, the one or more QoS parameters comprising at least one of path bandwidth, path latency, path priority, or path protection.

In an eighth implementation form of the network function according to the second aspect or any preceding implementation form of the third aspect, the translation response further comprising a duration time value specifying a validity interval associated with the identifier.

According to a third aspect, a method for obtaining identifiers of transport paths between a first UPE and a second UPE is provided. The method comprising: sending, by a network function, to the first UPE, a session setup request information element (IE) comprising a destination transport interface address, and a S-NSSAI, the session setup request IE adapted to obtain a first identifier of a transport path between the first UPE and the second UPE; and determining, by the network function, that the transport path between the first UPE and the second UPE is admitted, and based thereon, sending, by the network function, to the second UPE, a session establishment request comprising a source transport interface address, and the S-NSSAI, the session establishment request adapted to obtain a second identifier of a transport path between the second UPE and the first UPE.

In a first implementation form of the method according to the third aspect, the destination transport interface address comprising an Internet Protocol address of the second UPE and the source transport interface address comprising an IP address of the first UPE.

In a second implementation form of the method according to the third aspect or any preceding implementation form of the third aspect, the session setup request IE being sent in an access and mobility function (AMF) next generation application protocol (NGAP) message and the session establishment request being sent in an N4 message.

In a third implementation form of the method according to the third aspect or any preceding implementation form of the third aspect, determining that the transport path between the first UPE and the second UPE is admitted comprising: sending, by the network function, to a transport network function, a path load request message comprising network slice information, the S-NSSAI, the source transport interface address, and the destination transport interface address, the path load request message adapted to initiate load control; receiving, by the network function, from the transport network function, a path load response message responsive to the path load request message, the path load response message comprising network slice information, the S-NSSAI, the source transport interface address, and the destination transport interface address; and determining, by the network function, that a load associated with the transport path is supported.

In a fourth implementation form of the method according to the third aspect or any preceding implementation form of the third aspect, the network function comprising a session management function.

According to a fourth aspect, a network function is provided. The network function comprising: one or more processors; and a non-transitory memory storage comprising instructions that, when executed by the one or more processors, cause the network function to: send, to a first UPE, a session setup request IE comprising a destination transport interface address, and a S-NSSAI, the session setup request IE adapted to obtain a first identifier of a transport path between the first UPE and a second UPE; and determine that the transport path between the first UPE and the second UPE is admitted, and based thereon send, to the second UPE, a session establishment request comprising a source transport interface address, and the S-NSSAI, the session establishment request adapted to obtain a second identifier of a transport path between the second UPE and the first UPE.

In a first implementation form of the network function according to the fourth aspect, the destination transport interface address comprising an Internet Protocol address of the second UPE and the source transport interface address comprising an IP address of the first UPE.

In a second implementation form of the network function according to the fourth aspect or any preceding implementation form of the fourth aspect, the session setup request IE being sent in an AMF NGAP message and the session establishment request being sent in an N4 message.

In a third implementation form of the network function according to the fourth aspect or any preceding implementation form of the fourth aspect, the instructions further causing the network function to send, to a transport network function, a path load request message comprising network slice information, the S-NSSAI, the source transport interface address, and the destination transport interface address, the path load request message adapted to initiate load control; receive, from the transport network function, a path load response message responsive to the path load request message, the path load response message comprising network slice information, the S-NSSAI, the source transport interface address, and the destination transport interface address; and determine that a load associated with the transport path is supported.

In a fourth implementation form of the network function according to the fourth aspect or any preceding implementation form of the fourth aspect, the instructions further causing the network function to send a path load request message comprising network slice information, the S-NSSAI, the source transport interface address, and the destination transport interface address, the path load request message adapted to initiate load control; receive a path load response message responsive to the path load request message, the path load response message comprising network slice information, the S-NSSAI, the source transport interface address, and the destination transport interface address; and determine that a load associated with the transport path is supported.

An advantage of a preferred embodiment is that the resolution of MTNC identifying information from 3GPP slice specific identifying information is performed in a user plane entity.

Yet another advantage of a preferred embodiment is that the mapping of MTNC identifying information to IP ports simplify encoding as well as enable network load balancing.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 9 illustrates a diagram of an example MTNC-ID to source port mapping according to example embodiments presented herein;

FIG. 10 illustrates a flow diagram of example operations occurring the provisioning of a MTNC-ID according to example embodiments presented herein;

FIG. 11A illustrates a flow diagram of example operations occurring in a session management function (SMF) participating in the provisioning PDU resources for a UE session according to example embodiments presented herein;

FIG. 11B illustrates a flow diagram of example operations occurring in a gNB participating in the provisioning PDU resources for a UE session according to example embodiments presented herein;

FIG. 11C illustrates a flow diagram of example operations occurring in a UPF participating in the provisioning resources for a UE session according to example embodiments presented herein;

FIG. 11D illustrates a flow diagram of example operations occurring in a TNF-front end (FE) participating in the provisioning PDU resources for a UE session according to example embodiments presented herein;

FIG. 11E illustrates a flow diagram of example operations occurring in a TNF-back end (BE) participating in the provisioning PDU resources for a UE session according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Network services requested by users are often associated with requirements, e.g., quality of service (QoS) requirements, which need to be met so that the users may receive certain levels of service contracted. Transport networks that are configured to provide transport services also need to provision transport resources according to these requirements for forwarding traffic.

Embodiments of the present disclosure provide methods and apparatus that translate (or resolve) multi-transport network context-identifiers (MTNC-IDs) from Third Generation Partnership Project (3GPP) slice specific identifying information (e.g., network slice selection assistance information (NSSAI) or serving NSSAI (S-NSSAI)) for traffic transmission by a user plane entity (UPE). The translation between the NSSAI and the MTNC-ID is stored at the user plane entity, allowing for easy maintenance of the information. Also provided are methods and apparatus for mapping MTNC-IDs to IP ports to simplify encoding as well as enable network load balancing.

A MTNC-ID corresponding to a forwarding path may be sent to a session management function (SMF), which may configure a user plane function (UPF) in a user session with the MTNC-ID so that the UPF associates the MTNC-ID with data packets to be forwarded on the forwarding path. The MTNC-ID may also be sent to one or more transport networks on the forwarding path, where routers of each transport network may be programmed (configured) so that traffic associated with the MTNC-ID may be routed according to the MTNC-ID.

Each MTNC-ID is created uniquely for a corresponding forwarding path, and may be used across multiple transport networks and multiple domains, such as across a mobile network and a transport network, on a corresponding forwarding path. The MTNC-IDs support routing of data packets by each of the transport networks on a forwarding path, and provide flexibility for each transport network to provide routing services based on dynamically varying resource provisioning requirements. The MTNC-IDs further facilitate transmission of data packets on a forwarding path, which may be forwarded using an agreed level of service that is identified by a MTNC-ID carried in the data packets.

Figure 1:
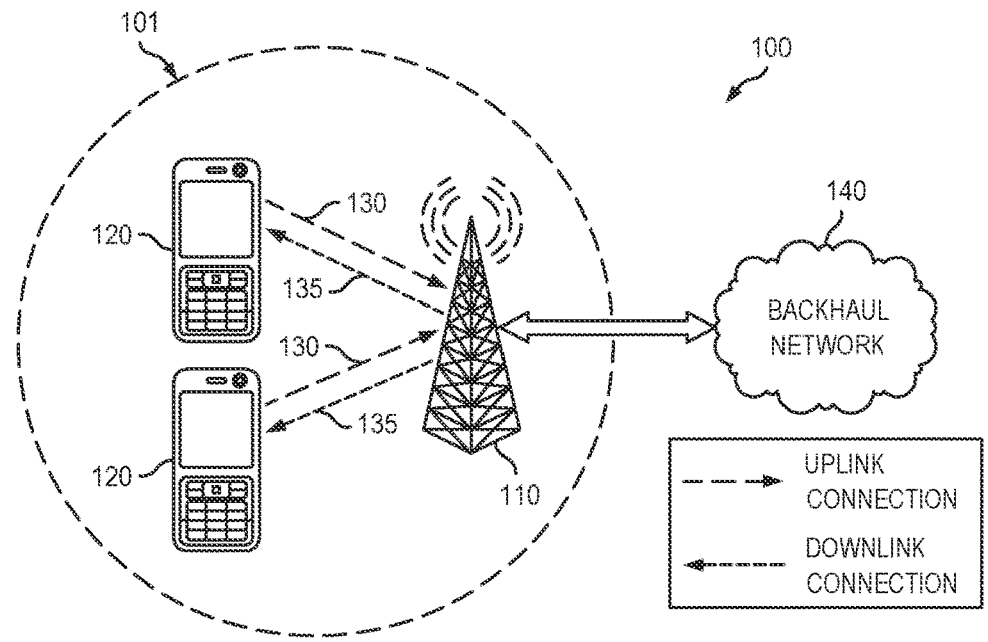
FIG. 1 illustrates a network for communicating data.

FIG. 1 illustrates a network 100 for communicating data. The network 100 comprises a base station 110 having a coverage area 101, a plurality of mobile devices 120, and a backhaul network 130. As shown, the base station 110 establishes uplink 130 and/or downlink 135 connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 140. As used herein, the term "base station" refers to any component (or collection of components) configured to provide wireless access to a network, such as an access nodeNode Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, or other wirelessly enabled devices. Base stations may provide wireless access in accordance with one or more wireless communication protocols, e.g., long term evolution (LTE), LTE advanced (LTE-A), 5G, 5G LTE, 5G NR, High Speed Packet Access (HSPA), the IEEE 802.11 family of standards, such as 802.11a/b/g/n/ac/ad/ax/ay/be, etc. As used herein, the term "mobile device" refers to any component (or collection of components) capable of establishing a wireless connection with a base station, such as a user equipment (UE), mobile stations, mobiles, terminals, users, subscribers, stations, and other wirelessly enabled devices. In some embodiments, the network 100 may comprise various other wireless devices, such as relays, low power nodes, etc.

Figure 2:
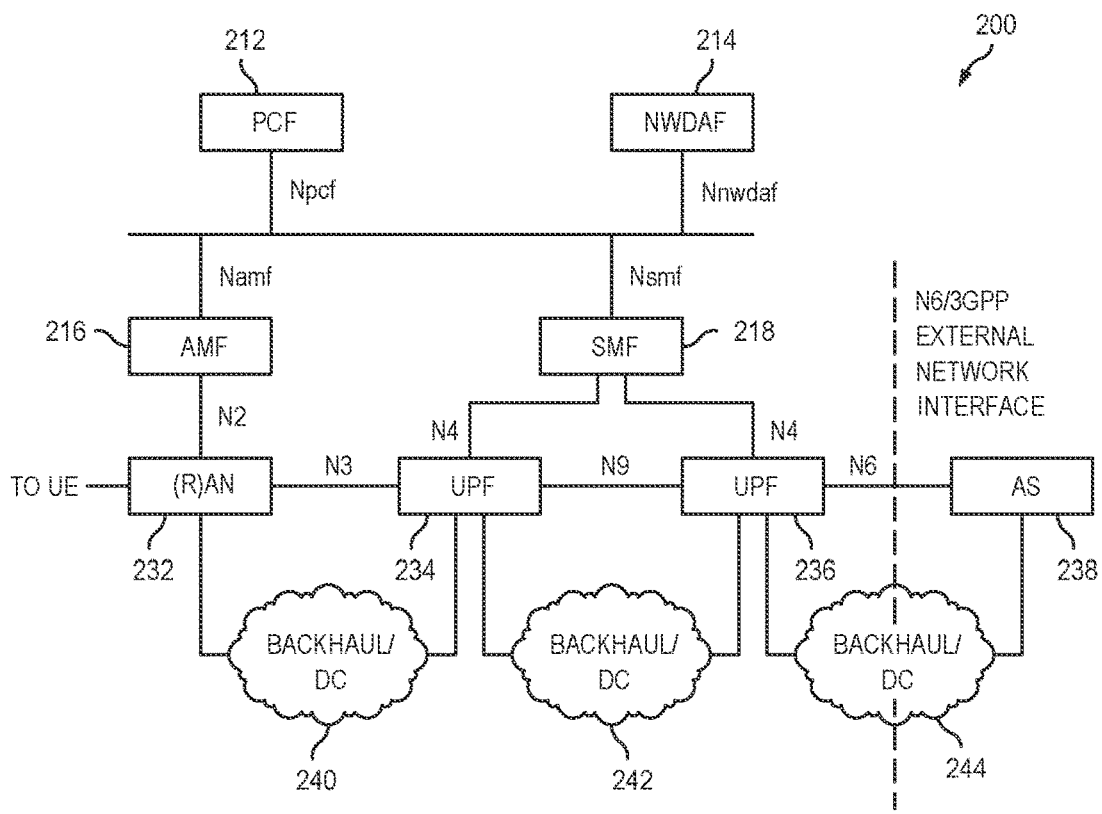
FIG. 2 illustrates a diagram of Third Generation Partnership Project (3GPP) control plane functions for setting up user plane connections.

FIG. 2 illustrates a diagram 200 of Third Generation Partnership Project (3GPP) control plane functions for setting up user plane connections. Specifically, FIG. 2 illustrates 3GPP control plane functions (e.g., an access and mobility management function (AMF), a SMF, etc.) that provide access and session handling capabilities for setting up user plane connections across an interface N3 (for a communication segment between a radio access network (RAN) and a UPF), across an interface N9 (for a segment between UPFs), and across an interface N6 (for a segment between a UPF and an edge network and/or other external destinations).

The control plane functions shown in FIG. 2 includes a policy control function (PCF) 212, a network data analysis function (NWDAF) 214, an AMF 216, and a SMF 218. 3GPP specifications, including Technical Specification (TS) 23.501 and TS 23.502, describe these control plane and user plane functions in detail. For example, SMF 218 is responsible for handling individual user sessions, in particular, IP addresses, routing, and mobility. SMF 218 provisions user sessions subject to network and subscription policy as defined in PCF 212. NWDAF 214 is responsible for network data analysis, i.e., analysis on data from various 3GPP network functions (NFs). AMF 216 is responsible for handling connection and mobility management.

Each of the control plane functions communicate with other functions through their specific interfaces. For example, PCF 212 communicates via an interface Npcf, NWDAF 214 communicates via an interface Nnwdaf, AMF 216 communicates via an interface Namf, and SMF 218 communicates via an interface Nsmf.

In the user plane, UEs may access a (R)AN 232 for wireless communication, and traffic may be routed between the (R)AN 232 and a UPF 234 via N3, between UPF 234 and a UPF 236 via N9, and between UPF 236 and an application server (AS) 238 via N6. The interface between UPF 236 and AS 238 may be N6 or a 3GPP external network interface. A UPF may support features and capabilities that facilitate user plane operation, including packet routing and forwarding, interconnection to the data network, policy enforcement, and data buffering.

The end-to-end connections for those interfaces, i.e., N3, N9, and N6, may traverse a backhaul network or a data center (DC) network. For example, the connection over N3 traverses a backhaul/DC network 240, the connection over N9 traverses backhaul/DC network 242, and the connection over N6 traverses a backhaul/DC network 244. Each of the backhaul or DC network may be referred to as a transport network, and traffic are routed or transported through a transport network corresponding to an interface. The corresponding transport underlay for these interfaces N3, N6 and N9 may need to be traffic engineered to support various 5G use cases. For example, to satisfy requirements such as low latency, and high reliability for data flows, as well as the ability to support dynamically varying demands on network capacity, software defined network (SDN)-controllers (SDN-Cs) in the transport domain may need to get requests from a 3GPP system and provide the path capabilities requested.

Conventionally, mobile network backhauls use static configuration and provisioning of routers for traffic engineering (TE), where TE is configured periodically (e.g., weekly or monthly) based on demand and other performance criteria. The backhauls provide statically traffic engineered paths for forwarding traffic.

However, in 5G systems with a large range of services, low latency paths and mobility, the demand estimate varies much more dynamically (e.g., in the order of several minutes in the worst cases). Thus, backhaul networks that provide capabilities to reprogram routers and switches to meet the dynamically changing traffic demand profiles are desirable.

Further, the base capability found in Internet Engineering Task Force (IETF) Abstraction and Control of Traffic Engineered Networks (ACTN) has been applied in 3GPP mobile networks. The IETF ACTN capabilities in the transport underlay may interact with a mobile network controller to know how to program the routes based on traffic demand information, slices, QoS, and network policies. A network policy (or a TE policy) may specify packet data network (PDN) session establishment and detach information for each transport path, traffic routing and re-routing information derived from performance data, etc. In return, the 3GPP mobile network may require dynamic feedback from the underlay transport network to recalculate projected demand for TE paths on a continuous basis.

It is desirable that the backhaul and DC networks may support or provide dynamically traffic engineered paths (i.e., transport paths) to accommodate dynamically varying traffic demand, as well as other requirements, such as latencies (including both deterministic latency and non-deterministic latency), jitter (in case of non-deterministic latency), bandwidths, and protection levels. These paths may be set up for data plane as well as control plane traffic. It is also desirable that the backhaul and DC networks may support or provide provision of dynamic paths on per slice and per QoS class basis, provide feedback (or monitoring) information of these paths from the transport network underlay, and provide capabilities for configuring these paths across more than one administrative domain.

Network slices are end-to-end logical networks implemented on a shared physical infrastructure. The network slices provide agreed-upon functional or behavioral standards. As an example, a service provider may offer a variety of network slices, with each network slice potentially meeting a different set of service quality requirements. Network slices span multiple parts of the shared physical infrastructure, including but not limited to terminals, access networks, core network, and transport networks. Hence, there is an association between a network slice and components of one or more transport networks, where the components of the one or more transport networks that forward packets of the network slice need to be able to identify the packets of the network slice in order to properly process the packets of the network slice. Paths associated with network slices are typically one-way paths. Hence a bi-directional connection comprises two one-way paths, with an upstream path between a first device and a second device and a downstream path between the second device and the first device.

As an example, in 3GPP network slices, packets associated with a particular network slide may be identified by NSSAI or S-NSSAI, while in the transport network, packets may be identified by MTNC-IDs.

Figure 3:
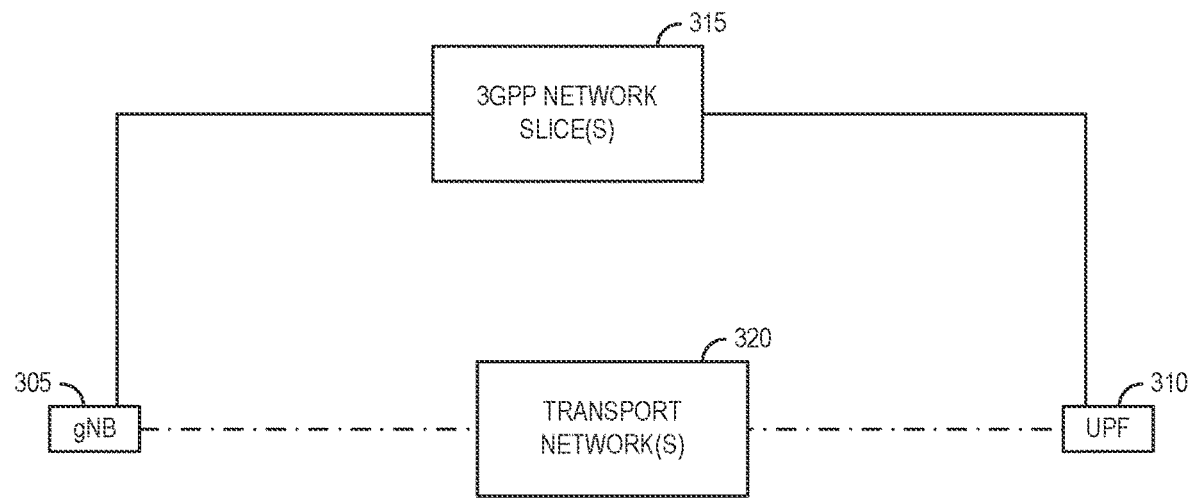
FIG. 3 illustrates a communication system highlighting a relationship between 3GPP network slices and underlying transport networks.

FIG. 3 illustrates a communication system 300 highlighting a relationship between 3GPP network slices and underlying transport networks. Communication system 300 includes a gNB 305 and a UPF 310 connected by one or more 3GPP network slices 315. As discussed previously, a 3GPP network slice is an end-to-end logical connection that is implemented on a shared physical infrastructure. As shown in FIG. 3, one or more 3GPP network slices 315 are implemented on components of one or more transport networks 320. gNBs, UPFs, branch point UPFs (BP-UPFs), uplink classifier UPFs (ULCL-UPFs), PDCP session anchor UPFs (PSA-UPFs), and serving gateways are examples of UPEs.

The packets of a 3GPP network slice may be associated with a NSSAI or a S-NSSAI of the 3GPP network slice, while Internet Protocol (IP) packets containing the packets of the 3GPP network slice traversing one or more transport networks 320 are identified by a MTNC-ID associated with the 3GPP network slice. Therefore, there is a need for resolving MTNC-IDs from NSSAI or S-NSSAI.

According to an example embodiment, methods and apparatus for resolving MTNC-IDs from NSSAI or S-NSSAI are provided. As discussed previously, a mapping of network slices (e.g., 3GPP network slices) to transport networks (such as backhaul networks) establishes a relationship between network slices and components of transport networks that are used to forward packets associated with the network slices to their intended destinations. It is possible to use static configuration and provisioning of the components of the transport networks to implement the mapping of network slices to transport networks. However, the static configuration and provisioning of the components of the transport networks are generally unable to support network slice features such as subscriptions, etc.

Figure 4A:
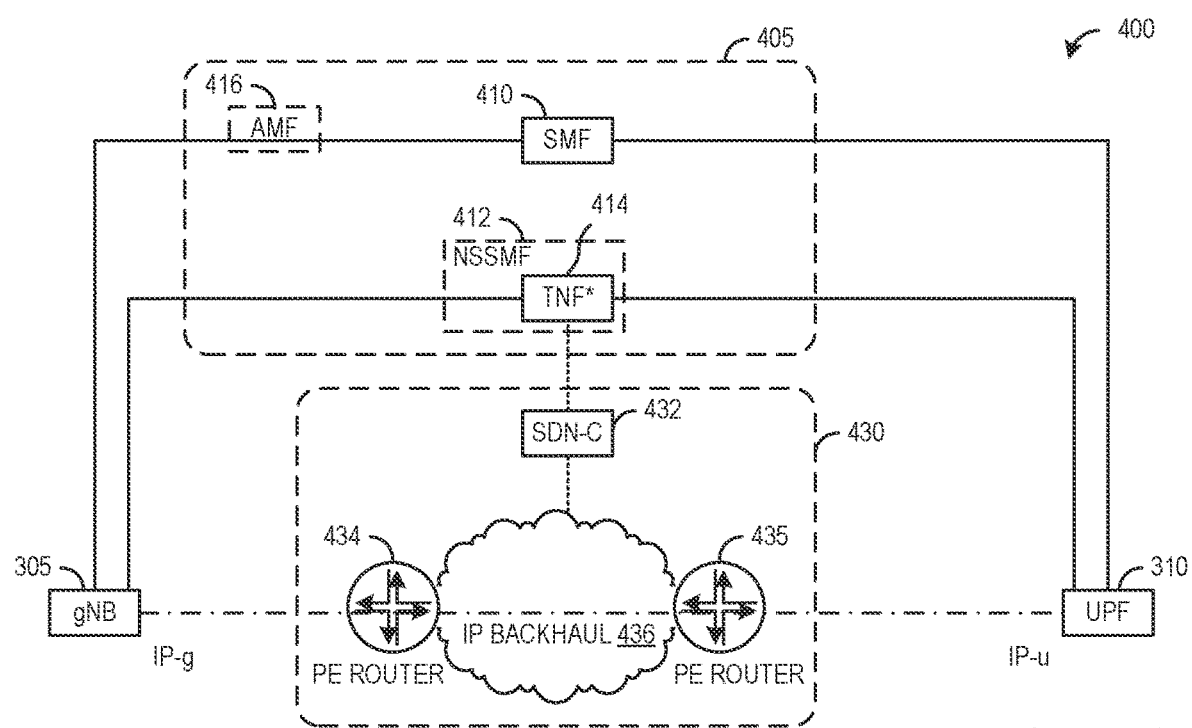
FIG. 4A illustrates a communication system highlighting control plane and user plane entities associated with configuring a network slice between a next generation NodeB (gNB) and a user plane function (UPF) according to example embodiments presented herein.

FIG. 4A illustrates a communication system 400 highlighting control plane and user plane entities associated with configuring a network slice between a gNB and a UPF. As shown in FIG. 4A, a network slice 405 provides a forward path between gNB 305 and UPF 310. The end-to-end logical connection of network slice 405 is implemented on a transport network 430. Although shown as a single network, transport network 430 may include multiple transport networks. Transport network 430 is illustrated as a single network to simplify FIG. 4A.

Entities associated with network slice 405 include a SMF 410, a network slice selection management function (NSSMF) 412, a transport network function (TNF) 414, and AMF 416. NSSMF 412 provides management related services for network slice 405, while TNF 414 provides functions supporting interaction with transport network 430. TNF 414 may be a part of NSSMF 412 or a stand-alone entity.

Transport network 430 includes a software defined network controller (SDN-C) 432 that configures components of transport network 430, including but not limited to provider edge (PE) routers 434-435, and IP backhaul 436. SDN-C 432 configures PE routers 434-435 and IP backhaul 436 to implement network slice 405.

In order to resolve the MTNC-ID for a network slice between a gNB and a UPF, the interface IP addresses of gNB 305 and UPF 310 are needed. During the setup of an end user session, SMF 410 initiates protocol data unit (PDU) resource provisioning at both gNB 305 and UPF 310. However, while SMF 410 controls UPF 310 (and also knows the location of UPF 310, through the IP address of UPF 310, which is denoted IP-u), SMF 410 does not necessarily know the IP address of gNB 305, which is denoted IP-g. Instead, SMF 410 may rely on AMF 416 to proxy initial session establishing messages, such as a PDU Setup Request message.

In an embodiment, gNB 305 and UPF 310 participate in resolving respective MTNC-IDs (for the upstream and downstream paths between gNB 305 and UPF 310). Because the signaling for PDU session establishment from SMF 410 can provide needed parameters (e.g., 3GPP QoS and network slice information, IP interface addresses, and so on), gNB 305 and UPF 310 can assist in resolving respective MTNC-IDs for both of the one-way paths.

Figure 4B:
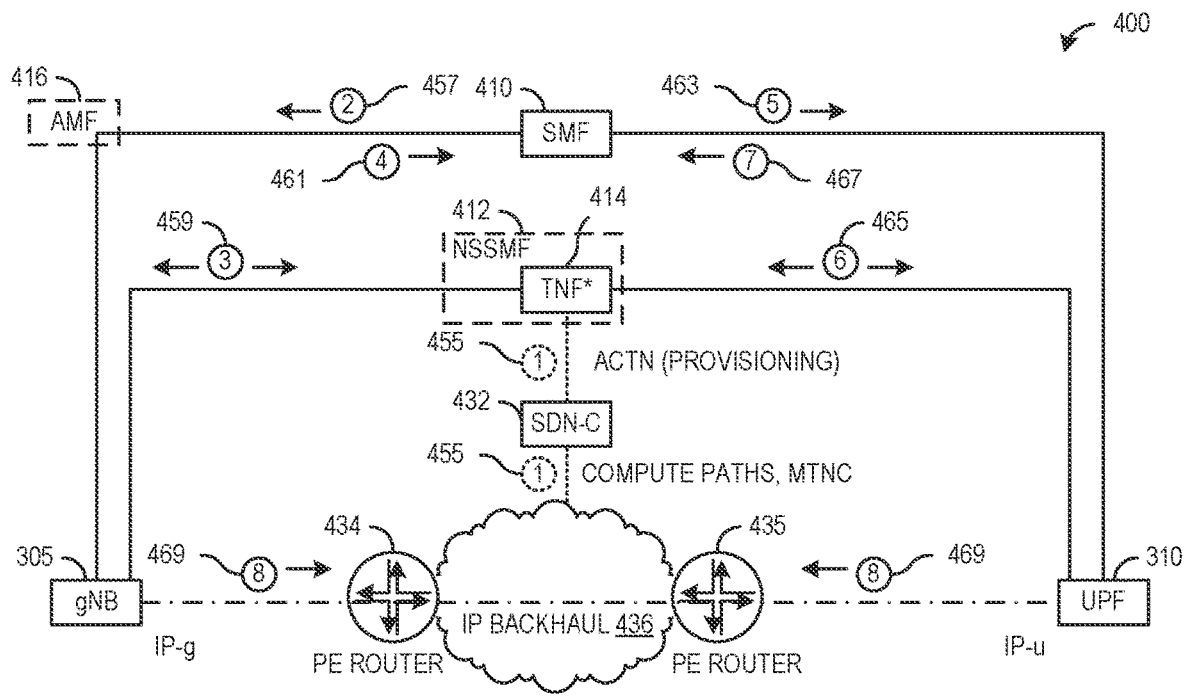
FIG. 4B illustrates communication system highlighting an exchange of signaling involved in resolving multi-transport network context-identifiers (MTNC-IDs) at gNB and UPF for a protocol data unit (PDU) session, with participation from the gNB and UPF according to example embodiments presented herein.

FIG. 4B illustrates communication system 400 highlighting an exchange of signaling involved in resolving MTNC-IDs at gNB and UPF for a PDU session, with participation from the gNB and UPF. The exchange of signaling shown in FIG. 4B present two control flows. A first control flow illustrates the provisioning of MTNC-IDs between the 3GPP domain (including NSSMF 412 and TNF 414) and IP domain (involving SDN-C 432 and PE routers 434-435). The provisioning of the MTNC-IDs between the 3GPP and IP domains represents dynamical TE of the PATH (with a much slow time than per session sequence). A second control flow illustrates the provisioning of the PDU resources for a UE session.

Events #1 455 comprise a MTNC-ID provisioning (i.e., TE) signaling sequence involving TNF 414 and SND-C 432. In events #1 455, TNF 414 subscribes and obtains measurements and information, including but not limited to historical information, session establishment rates, and so forth, to estimate path characteristics and requirements across the IP backhaul. TNF 414 may be distributed across various entities and coordinates MTNC-ID values used across the provisioning domain. TNF 414 and SDN-C 432 provision a MTNC-ID and associated contract in order to deliver the class of service (CoS), isolation, path protection, etc. SDN-C 432 provisions the MTNC-ID with PE routers 434-435 across the provisioned domain. First control flow comprises events #1 455.

Second control flow illustrates the provisioning of PDU resources and comprises events #2-#7.

Event #2 457 comprises signaling involved with a PDU session initial attach sequence between a UE and the Fifth Generation core (5GC) network. In event #2 457, SMF 410 signals gNB 305 (using a next generation application protocol (NGAP) message) through AMF 416. SMF 410 sends a PDU session resource setup request transfer information element (IE) (in the NGAP message) to gNB 305. The PDU session resource setup request transfer IE includes the IP transport interface address of UPF 310 (denoted IP-u), and 3GPP network slice information (e.g., S-NSSAI or NSSAI). The IP-u and the S-NSSAI may be included in the common network instance parameter.

Event #3 459 comprises gNB 305 processing the request to setup resources in the user plane. In an embodiment, in order to resolve network slice specific aspects in the transport plane from gNB 305 to UPF 310, gNB 305 sends a request to TNF 414. As an example, gNB 305 sends to TNF 414 a translate-request message. The translate-request message includes the 3GPP network slice information (e.g., S-NSSAI or NSSAI), source information (e.g., the IP transport interface address of gNB 305 (denoted IP-g)), destination information (e.g., the IP transport interface address of UPF 310 (denoted IP-u)), and parameters for conveying path requirements (such as latency, bandwidth, subscription, priority, protection, etc.). In an embodiment, in order to resolve network slice specific aspects in the transport plane from gNB 305 to UPF 310, TNF 414 sends a response to gNB 305. As an example, TNF 414 sends to gNB 305 a translate-response message. The translate-response message includes the transport network identifier (i.e., a MTNC-ID). Alternatively, the translate-response message includes a mapped UDP source port that is representative of the MTNC-ID. In an embodiment, TNF 414 stores information related to the 3GPP network slice information and the MTNC-ID. The information may be stored in tabular form, for example. A detailed discussion of the information is provided below.

Upon reception of the translate-response message, gNB 305 has knowledge of the MTNC-ID or the mapped UDP source port representative of the MTNC-ID. In the situation that the translate-response message includes the MTNC-ID, gNB 305 may perform the MTNC-ID to UDP source port mapping in accordance with a mapping known by gNB 305, TNF 414, and UPF 310. In the situation that the translate-response message includes the UDP source port representative of the MTNC-ID, gNB 305 has knowledge of the source port corresponding to the MTNC-ID used to encapsulate the user plane packets from gNB 305 to UPF 310.

Event #4 461 comprises signaling involved with a PDU session initial attach sequence. In event #4 461, gNB 305 signals SMF 410 (in an NGAP message) and provides its IP transport interface address (IP-g) to SMF 410. gNB 305 sends a PDU session response transfer IE in the NGAP message, with the PDU session response transfer IE including the IP transport interface address (IP-g) of gNB 305.

Event #5 463 comprises signaling involved with the PDU session initial attach sequence. In event #5 463, SMF 410 signals UPF 310 (using an N4 message). SMF 410 sends a packet forwarding control protocol (PFCP) session establishment request message with a forward action rule (FAR) that includes 3GPP network slice information (e.g., S-NSSAI or NSSAI) and the IP transport interface address of gNB 305 (IP-g).

Event #6 465 comprises UPF 310 processing the request to setup resources in the user plane. In an embodiment, in order to resolve network slice specific aspects in the transport plane from UPF 310 to gNB 305, UPF 310 sends a request to TNF 414. As an example, UPF 310 sends to TNF 414 a translate-request message. The translate-request message includes the 3GPP network slice information (e.g., S-NSSAI or NSSAI), source information (e.g., the IP transport interface address of UPF 310 (denoted IP-u)), destination information (e.g., the IP transport interface address of gNB 305 (denoted IP-g)), and parameters for conveying path requirements (such as latency, bandwidth, subscription, priority, protection, etc.). In an embodiment, in order to resolve network slice specific aspects in the transport plane from UPF 310 to gNB 305, TNF 414 sends a response to UPF 310. As an example, TNF 414 sends to UPF 310 a translate-response message. The translate-response message includes the transport network identifier (i.e., a MTNC-ID). Alternatively, the translate-response message includes a mapped UDP source port that is representative of the MTNC-ID. In an embodiment, TNF 414 stores information related to the 3GPP network slice information and the MTNC-ID. The information may be stored in tabular form, for example. A detailed discussion of the information is provided below.

Upon reception of the translate-response message, UPF 310 has knowledge of the MTNC-ID or the mapped UDP source port representative of the MTNC-ID. In the situation that the translate-response message includes the MTNC-ID, UPF 310 may perform the MTNC-ID to UDP source port mapping in accordance with a mapping known by UPF 310, TNF 414, and gNB 305. In the situation that the translate-response message includes the UDP source port representative of the MTNC-ID, UPF 310 has knowledge of the source port corresponding to the MTNC-ID used to encapsulate the user plane packets from UPF 310 to gNB 305.

Event #7 467 comprises signaling involved with a PDU session initial attach sequence. In event #7 467, UPF 310 signals SMF 410 (using an N4 message). UPF 310 sends a PFCP session establishment response message with a success indicator. The PFCP session establishment response message also includes the IP transport interface address (IP-u) of UPF 310.

A PE router (such as PE routers 434-435) on a transport path may use the UDP source port to map the incoming traffic to one of the TE paths with characteristics determined in accordance with the MTNC-ID to the destination address (such as a destination PE). This is shown in FIG. 4B as events #8 469. As an example, for the transport path from UPF 310 to gNB 305, PE router 435 uses the UDP source port map incoming traffic to one of the TE paths in IP backhaul 436. Similarly, for the transport path from gNB 305 to UPF 310, PE router 434 uses the UDP source port to map incoming traffic to one of the TE paths in IP backhaul 436.

As an illustrative example, incoming traffic at PE router 435 (emitted from UPF 310) with the MTNC-ID encoded in the UDP source port may be mapped onto a virtual private network (VPN) in PE router 435. The VPN may be setup to isolate the traffic from various slices in IP backhaul 436 between PE routers 434-435 or for different customers sharing IP backhaul 436. It may also be possible to map incoming traffic at a PE router without using VPNs.

In an embodiment, transport paths would be monitored by SDN-C 432. Deterioration in path properties may be determined by TNF 414 and TNF 414 compensates for the detected deterioration. As an example, TNF 414 may make changes to the TE to compensate for the detected deterioration. The changes to the TE are eventually applicable to both existing and new traffic on the UPF, e.g., UPF 310.

Upon completion of events #1-#7, when the UE receives or transmits data, the IP transport network for the user plane between gNB 305 and UPF 310 is able to deliver the level of service associated with the MTNC-ID.

In an embodiment, the resolution of the MTNC-ID from the S-NSSAI may be in accordance with configuration information, network slice information, measurement information, analytic information, or a combination thereof. FIG.

5 illustrates a diagram 500 of network functions involved in resolving the MTNC-ID. The configuration information may be provided by a network repository function (NRF) 510 and may include network topology, IP addresses, and so forth. The network slice information may be provided by a network slice selection function (NSSF) 512 and may include NSSAI, S-NSSAI, slice characteristics, and so on. The analytic information may be provided by a network data analytics function (NWDAF) 514 and may include analytics, data, etc. TNF 414 utilizes the information and resolves the MTNC-ID, which is used by SDN-C 432 to determine paths, as well as provision the MTNC-ID at PE routers of IP network 505.

Figure 5:
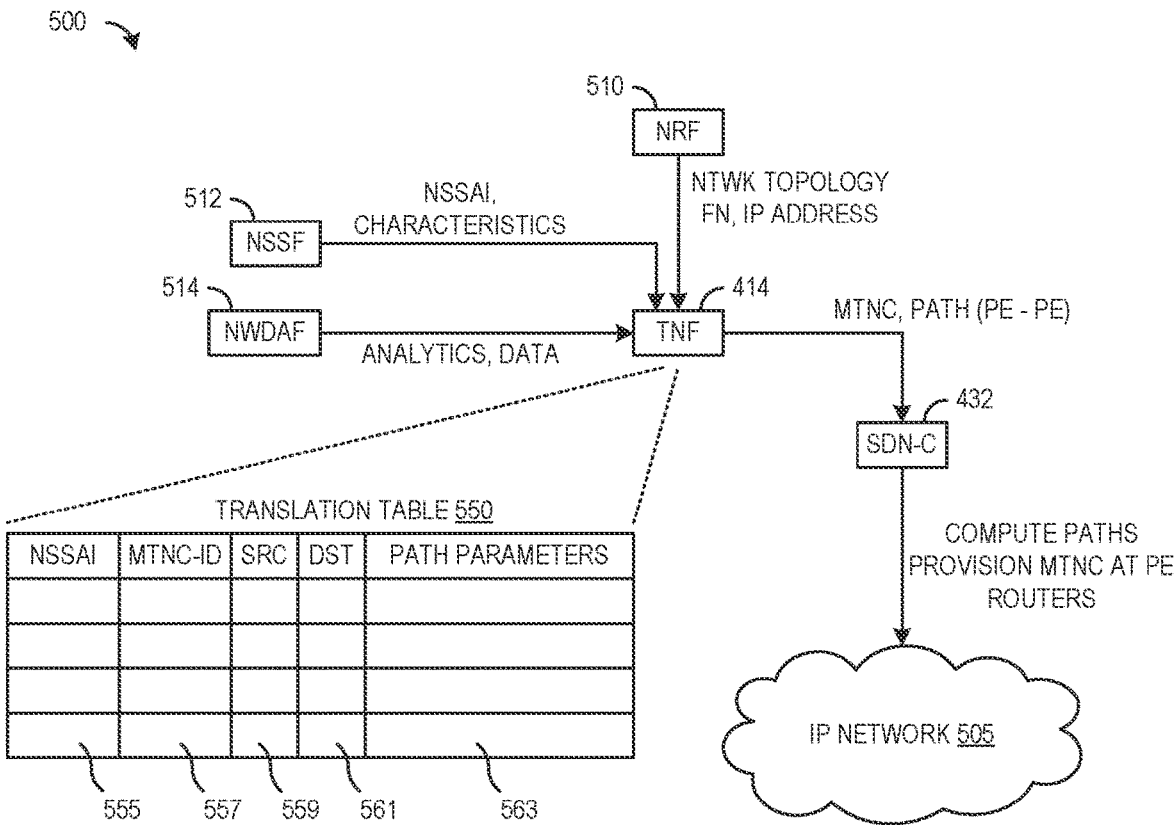
FIG. 5 illustrates a diagram of network functions involved in resolving the MTNC-ID according to example embodiments presented herein.

As an example, the information related to the 3GPP network slice information and the MTNC-ID is stored in tabular form in TNF 414. The information related to the 3GPP network slice information and the MTNC-ID is stored in a translation table 550, for example. Translation table 550 may include 3GPP network slice information 555 (e.g., NSSAI or S-NSSAI), MTNC-ID 557, source information 559 (e.g., IP transport interface address of the source of the path associated with the 3GPP network slice information and the MTNC-ID), destination information 561 (e.g., IP transport interface address of the destination of the path associated with the 3GPP network slice information and the MTNC-ID), and path parameters 563 (e.g., parameters conveying latency, bandwidth, subscription, priority, protection, etc.). Although shown in FIG. 5 with a specific arrangement, translation table 550 may have other arrangements (as an example, MTNC-ID 557 and 3GPP network slice information 555 may be reversed, or path parameters 563 may be presented before source information 559 and destination information 561. Additionally, alternative arrangements of translation table 550 may include information not shown in FIG. 5.

Translation table 550 may be searched using the 3GPP network slice information. As an example, TNF 414 may receive a query for a particular NSSAI or S-NSSAI value and TNF 414 can search translation table 500 for the NSSAI or S-NSSAI value. Translation table 500 may also be searched using other values, such as the MTNC-ID, source information, destination information, etc.

gNB 305 or UPF 310 may send translate-request messages with 3GPP network slice information (e.g., in events #3 459 or #6 465 of FIG. 4B) to TNF 414 to determine a TE path on N3 or N9 interfaces. TNF 414 may search translation table 550 to find an existing path associated with the 3GPP network slice information. If there is not already an existing path, TNF 414 may proceed with provisioning a MTNC-ID and establish a path that meets the path parameters provided by gNB 305 or UPF 310.

In an embodiment, a TNF translation function is provided to perform the 3GPP network slice information to MTNC-ID translation. The TNF translation function maintains the translation table (e.g., translation table 550) derived by a TNF. The TNF translation function also resolves requests for MTNC-ID translation from 3GPP network slice information, source information, destination information, and path parameters.

Figure 6:
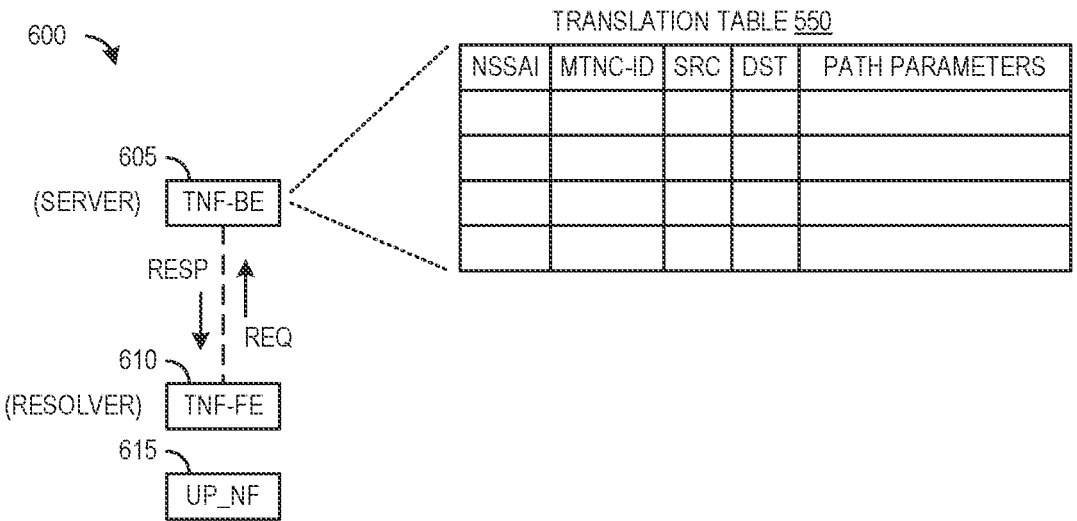
FIG. 6 illustrates an example transport network function (TNF) translation function according to example embodiments presented herein.

FIG. 6 illustrates an example TNF translation function 600. TNF translation function 600 includes a server located in a TNF-backend (TNF-BE) 605. TNF-BE 605 may be realized in a management function, such as a NSSMF. The server maintains an authoritative translation table 550 derived by the TNF. TNF translation function 600 also includes a resolver located in a TNF-frontend entity (TNF-FE) 610. The resolver processes requests received by the TNF. TNF-FE 610 may be co-located with a user plane function (UP-NF) 615, such as a gNB, SMF, and UPF. A caching entity may be located in TNF-FE 610 to help improve response time for requests received by the TNF.

Operations between TNF-FE 610 and TNF-BE 605 may be request-response based. In other words, TNF-FE 610 may send a request message to TNF-BE 605 and TNF-BE 605 may send a response message in response to the request message. As an example, TNF-FE 610 sends a request message including 3GPP network slice information (e.g., S-NSSAI or NSSAI), source address, destination address, and path parameters (such as path QoS, and related parameters). The request message may also include a subscription option for maintaining a local copy of the MTNC-ID (and associated information) for cached storage at TNF-FE 610.

TNF-BE 605 searches the translation table and finds the MTNC-ID for the 3GPP network slice information. TNF-BE 605 sends a response message to TNF-FE 610 that includes the MTNC-ID. Alternatively, TNF-BE 605 maps the MTNC-ID to a UDP source port and sends the UDP source port in the response message. In the situation where the request message included the subscription option, the response message may include a duration that TNF-FE 610 can hold the MTNC-ID in its cache and locally translate the 3GPP network slice information to MTNC-ID. Once the duration expires, TNF-FE 610 can no longer perform the translation locally and would have to send a request message to TNF-BE 605. This subsequent request message may include the subscription option.

In the situation where TNF-FE 610 subscribed to the MTNC-ID translation, if a change is made to the translation table at TNF-BE 605 that impacts the MTNC-ID translation, TNF-BE 605 may send an update to TNF-FE 610, invalidating the MTNC-ID translation and causing TNF-FE 610 to request an updated MTNC-ID translation from TNF-BE 605. A detailed discussion of the update process is provided below.

Figure 7:
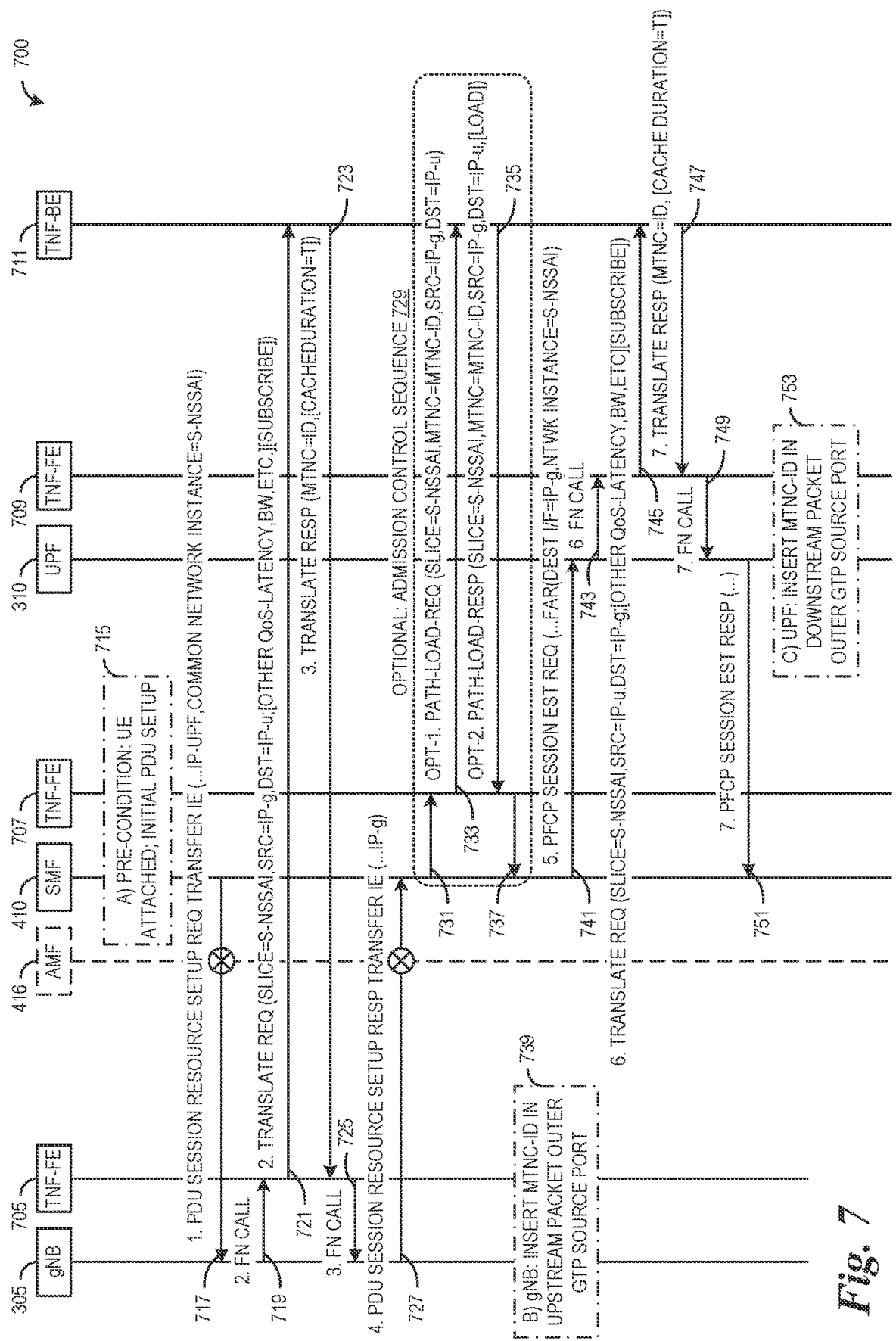
FIG. 7 illustrates a diagram of messages exchanged by entities and functions of a communication system participating in 3GPP network slice information to MTNC-ID translation according to example embodiments presented herein.

FIG. 7 illustrates a diagram 700 of messages exchanged by entities and functions of a communication system participating in 3GPP network slice information to MTNC-ID translation. Entities and functions include gNB 305, a first TNF-FE (of gNB 305) 705, AMF 416, SMF 410, a second TNF-FE (of SMF 410) 707, UPF 310, a third TNF-FE (of UPF 310) 709, and a TNF-BE 711.

As a pre-condition, a UE is attached to gNB 305 and is commencing with an initial PDU setup (block 715). SMF 410 initiates the establishment of the first segment (e.g., the upstream segment) of the PDU session by sending an AMF NGAP message with a PDU session resource setup request transfer IE (event 717). The PDU session resource setup request transfer IE may include (along with other information) 3GPP network slice information (e.g., S-NSSAI or NSSAI), and the IP transport interface address (IP-u) of UPF 310. The AMF NGAP message is proxied through AMF 416 because SMF 410 may not have knowledge of the IP transport interface address (IP-g) of gNB 305.

gNB 305 initiates first TNF-FE 705 to start a 3GPP network slice information to MTNC-ID translation by performing a function call (event 719). First TNF-FE 705 sends a translate-request message to TNF-BE 711 (event 721). The translate-request message may include the 3GPP network slice information, the source address (IP-g), the destination address (IP-u), and path parameters. The translate-request message may also include a subscribe option that will allow first TNF-FE 705 to hold the MTNC-ID translation for a period of time and use the MTNC-ID translation rather than sending further translate-request messages if there is a need to perform MTNC-ID translations in the future involving the 3GPP network slice information. TNF-BE 711 searches the translation table and finds the MTNC-ID corresponding to the 3GPP network slice information. If TNF-BE 711 is unable to find the MTNC-ID corresponding to the 3GPP network slice information, TNF-BE 711 may engineer a new path with the source address, destination address, and path parameters, and provision a MTNC-ID for the new path.

First TNF-FE 705 receives a translate-response message from TNF-BE 711 (event 723). The translate-response message may include the MTNC-ID translated from the 3GPP network slice information, IP-g, IP-u, and path parameters. If the MTNC-ID is received in the translate-response message, gNB 305 may perform a mapping of the MTNC-ID to a UDP source port in accordance with a mapping function that is known to gNB 305, SMF 410, and UPF 310. The mapping of the MTNC-ID to the UDP source port may be to balance the load throughout the IP network, for example. Alternatively, the translate-response message includes a UDP source port mapped from the MTNC-ID. The translate-response message may also include a duration value specifying how long first TNF-FE 705 can locally retain the MTNC-ID translation and locally perform the MTNC-ID translation. gNB 305 performs a function call (event 725) to process the translate-response message from TNF-BE 711.

gNB 305 sends an AMF NGAP message to send a PDU session resource setup response transfer IE (event 727). The PDU session resource setup message may include the IP transport interface address of gNB 305. The AMF NGAP message may be proxied to SMF 410 by AMF 416. At this point, gNB 305 may be ready to insert the MTNC-ID in the source port of general packet radio service (GPRS) tunneling protocol (GTP) encapsulated packets in upstream flows that correspond to the PDU connection established in events 717-727 (block 739).

Optionally, admission control is performed (events 729). SMF 410 may perform admission control (or load control). Normally, admission control is performed at the beginning (when the UE attaches), but because SMF 410 is only able to obtain the path address (IP-g and IP-u) at this instance, this is the earliest that SMF 410 can perform admission control. Admission control includes SMF 410 performing a function call (event 731) to cause second TNF-FE 707 to send a path-load-request message with 3GPP network slice information, MTNC-ID, source address (IP-g), and destination address (IP-u) of the path to TNF-BE 711 (event 733). TNF-BE 711 returns a path-load-response message with 3GPP network slice information, MTNC-ID, source address (IP-g), destination address (IP-u) of the path to indicate the load on the path (event 735). The load information may be in terms of available capacity, admission restrictions, and so on, of the path. The path-load-response message may also include load information of the path. Second TNF-FE 707 performs a function call to process the path-load-response message (event 737). If TNF-BE 711 returns high load levels or other admission restrictions, SMF 410 may initiate procedures to disconnect the established PDU connection at gNB 305, for example. As an example, SMF 410 may, based on network policy associated with the S-NSSAI, downgrade the transport path. As another example, if the network policy associated with the S-NSSAI dictates a minimum guarantee, SMF 410 may reject the path. The admission control of events 729 are for the N3 interface. In the case of the N9 interface, where SMF 410 controls both endpoints and UPF addresses of the path, SMF 410 would be able to perform admission control at the beginning of the setup process.

SMF 410 initiates the establishment of the second segment (e.g., the downstream segment) of the PDU session by sending an N4 message with a PFCP session establish request with FAR to UPF 310 (event 741). The PFCP session establish request with FAR including 3GPP network slice information, and destination address (IP-g). UPF 310 performs a function call to initiate third TNF-FE 709 send a translate-request message to TNF-BE 711 (event 743). Third TNF-FE 709 sends the translate-request message to TNF-BE 711 (event 745). The translate-request message includes the 3GPP network slice information, source address (IP-u), destination address (IP-g), and path parameters. The translate-request message may also include a subscribe option that will allow third TNF-FE 709 to hold the MTNC-ID translation for a period of time and use the MTNC-ID translation rather than sending further translate-request messages if there is a need to perform MTNC-ID translations in the future involving the 3GPP network slice information. TNF-BE 711 searches the translation table and finds the MTNC-ID corresponding to the 3GPP network slice information. If TNF-BE 711 is unable to find the MTNC-ID corresponding to the 3GPP network slice information, TNF-BE 711 may engineer a new path with the source address, destination address, and path parameters, and provision a MTNC-ID for the new path.

Third TNF-FE 709 receives a translate-response message from TNF-BE 711 (event 747). The translate-response message may include the MTNC-ID translated from the 3GPP network slice information, IP-g, IP-u, and path parameters. If the MTNC-ID is received in the translate-response message, UPF 310 may perform a mapping of the MTNC-ID to a UDP source port in accordance with a mapping function that is known to gNB 305, SMF 410, and UPF 310. The mapping of the MTNC-ID to the UDP source port may be to balance the load throughout the IP network, for example. Alternatively, the translate-response message includes a UDP source port mapped from the MTNC-ID. The translate-response message may also include a duration value specifying how long third TNF-FE 709 can locally retain the MTNC-ID translation and locally perform the MTNC-ID translation. UPF 310 performs a function call (event 749) to process the translate-response message from TNF-BE 711.

UPF 310 sends an N4 message with PFCP session establish response with FAR to SMF 410 (event 751). At this point, UPF 310 may be ready to insert the MTNC-ID in the source port of GTP encapsulated packets in downstream flows that correspond to the PDU connection established in events 741-751 (block 753).

Figure 8:
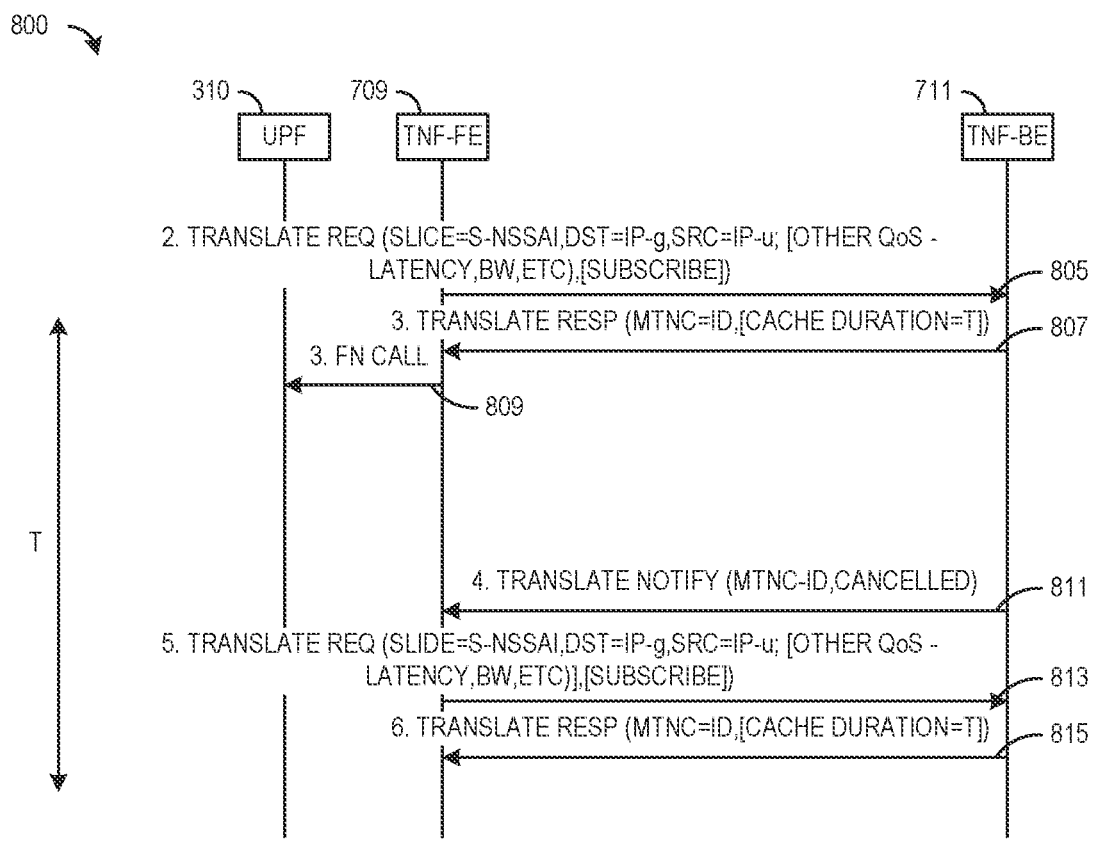
FIG. 8 illustrates a diagram of messages exchanged by entities and functions of a communication system participating in MTNC-ID translation subscription and caching according to example embodiments presented herein.

FIG. 8 illustrates a diagram 800 of messages exchanged by entities and functions of a communication system participating in MTNC-ID translation subscription and caching. Entities and functions include UPF 310, third TNF-PE 709, and TNF-BE 711. Although the diagram 800 illustrates messages exchanged in the MTNC-ID translation subscription and caching by UPF 310, MTNC-ID translation subscription and caching may also take place in gNB 305. The messages exchanged in the MTNC-ID translation subscription and caching at the gNB 305 are similar.

As shown in FIG. 8, third TNF-FE 709 sends a translate-request message to TNF-BE 711 (event 805). The translate-request message includes the 3GPP network slice information, source address (IP-u), destination address (IP-g), and path parameters. The translate-request message may also include a subscribe option that will allow third TNF-FE 709 to hold the MTNC-ID translation for a period of time and use the MTNC-ID translation rather than sending further translate-request messages if there is a need to perform MTNC-ID translations in the future involving the 3GPP network slice information. TNF-BE 711 searches the translation table and finds the MTNC-ID corresponding to the 3GPP network slice information. If TNF-BE 711 is unable to find the MTNC-ID corresponding to the 3GPP network slice information, TNF-BE 711 may engineer a new path with the source address, destination address, and path parameters, and provision a MTNC-ID for the new path.

Third TNF-FE 709 receives a translate-response message from TNF-BE 711 (event 807). The translate-response message may include the MTNC-ID translated from the 3GPP network slice information, IP-g, IP-u, and path parameters. If the MTNC-ID is received in the translate-response message, UPF 310 may perform a mapping of the MTNC-ID to a UDP source port in accordance with a mapping function that is known to gNB 305, SMF 410, and UPF 310. The mapping of the MTNC-ID to the UDP source port may be to balance the load throughout the IP network, for example. Alternatively, the translate-response message includes a UDP source port mapped from the MTNC-ID. The translate-response message may also include a duration value specifying how long third TNF-FE 709 can locally retain the MTNC-ID translation and locally perform the MTNC-ID translation. In an embodiment, in a situation where the translate-response message does not include the duration value, a default duration value may be utilized. The default duration value may be specified by a technical standard or an operator of the communication system. UPF 310 performs a function call (event 809) to process the translate-response message from TNF-BE 711.

Third TNF-FE 709, upon receipt of the translate-response message from TNF-BE 711, stores the MTNC-ID translation. Third TNF-FE 709 may start a timer with the duration value (as specified in the translate-response message or the default duration value). On expiration of the timer, third TNF-FE 709 may initiate another translate-request/translate-response message exchange to obtain additional subscription time for any path associated with the MTNC-ID translation that is active.

In an embodiment, it is possible for TNF-BE 711 to cancel active MTNC-ID translations. As an example, an existing MTNC-ID translation may be invalidated or otherwise changed. The existing MTNC-ID translation may become invalid due to changes in path configuration, a response to failures or policy changes, and so on. In such a situation, any cached version of the MTNC-ID translation is also invalid, but the TNF-FEs caching the MTNC-ID translation would not have knowledge of the invalidation of the MTNC-ID translation. Therefore, TNF-BE 711 may transmit a message to TNF-FEs cancelling the caching of the MTNC-ID translation. For discussion purposes, consider a situation where before the duration value specified by TNF-BE 711 or the default duration value expires, the MTNC-ID translation changes or becomes invalid. Then, in such a situation, TNF-BE 711 sends a translate notify message to third TNF-FE 709 (event 811). The translate notify message may indicate to third TNF-FE 709 that the MTNC-ID translation previously provided to third TNF-FE 709 is no longer valid and has been cancelled.

In an embodiment, if the path associated with the cancelled MTNC-ID translation remains active, the TNF-FE obtains an updated MTNC-ID translation to continue supporting traffic over the path. As an example, third TNF-FE 709 may elect to send another translate-request message to TNF-BE 711 (event 813). The translate-request message sent in event 813 may be similar to the translate-request message sent in event 805, or the translate-request message may be different. The messages may differ in the cache duration specified or the cache duration may be absent or present, for example. Both translate-request messages may have the same 3GPP network slice information, IP-g, IP-u, and path parameters, however. TNF-BE 711 sends a translate-response message (event 815). The translate-response message may include the MTNC-ID translated from the 3GPP network slice information, IP-g, IP-u, and path parameters. The translate-response message may also include a cache duration value.

As discussed previously, the 3GPP network slice information to MTNC-ID translation process may provide an MTNC-ID corresponding to the 3GPP network slice information. However, it is possible to encode the MTNC-ID translation to perform tasks such as load balancing at the gNB or UPF, or in the transport network. Furthermore, existing techniques that require extensions to existing protocols or technical standards can limit widespread acceptance of such techniques.

In an embodiment, the port corresponding to the MTNC-ID associated with the 3GPP network slice information is encoded to a source port. The port is mapped to a source port in the IP header of packets associated with the 3GPP network slice. Because a typical MTNC-ID is smaller than $2^{16}$ (65536), the MTNC-ID can be readily mapped into the 16-bit space of the source port in the IP header. In an embodiment, the operator of the communication system can provision a mapping between MTNC-ID and UDP port range so that load balancing requirements of the gNB or UPF, as well as the transport network, are met. Hence, instead of directly utilizing MTNC-ID as source port, a source port from within a range of source ports that is assigned to UE sessions to ensure that load balancing requirements of the UE sessions in the user plane end points (this is especially useful in the UPF) and in the nodes of the transport network are met.

FIG. 9 illustrates a diagram 900 of an example MTNC-ID to source port mapping. As shown in FIG. 9, a mapping function 905 receives an MTNC-ID as input and outputs a source port. The source port may be from a range of source ports allocated to help ensure load balancing requirements are met. Mapping function 905 may be implemented in a TNF-BE, such as TNF-BE 711 of FIG. 7. In such an implementation, translate-response messages sent by the TNF-BE may include the mapped source port rather than the MTNC-ID. Mapping function 905 may also be implemented in a distributed manner in the gNB or UPF. In such an implementation, the translate-response messages sent by the TNF-BE may include the MTNC-ID and then, the gNB or UPF would perform the MTNC-ID to source port mapping. In such an implementation, mapping function 905 may be different at the gNB or UPF. Alternatively, mapping function 905 may be the same at the gNB and UPF.

FIG. 10 illustrates a flow diagram of example operations 1000 occurring the provisioning of a MTNC-ID. Operations 1000 may be indicative of operations occurring in the provisioning of a MTNC-ID.

Operations 1000 begin with a TNF obtaining measurements and information (block 1005). The TNF may obtain measurements and information, such as historical information, session establishment rates, and so on. The TNF estimates path characteristics and requirements (block 1007). The measurements and information obtained by the TNF in block 1005 may be used to estimate path characteristics and requirements across the transport network. Example path characteristics and requirements include class of service, QoS requirements, latency requirements, bandwidth requirements, protection, isolation, etc. The MTNC-ID is provision (block 1009). The MTNC-ID and associated contract are provisioned to deliver service meeting the estimated path characteristics and requirements, for example. In addition to the TNF, the SDN-C also participates in MTNC-ID provisioning. The SDN-C may provision the MTNC-ID at PE routers, for example.

FIG. 11A illustrates a flow diagram of example operations 1100 occurring in a SMF participating in the provisioning PDU resources for a UE session. Operations 1100 may be indicative of operations occurring in a SMF as the SMF participates in the provisioning of PDU resources for a UE session.

Operations 1100 begin with the SMF sending a PDU session resource setup request message (block 1105). The PDU session resource setup request message may be sent to the gNB, but because the SMF may not have knowledge of the IP address of the gNB, the AMF proxies the PDU session resource setup request message. The PDU session resource setup request message includes the IP address of the UPF and the 3GPP network slice information (e.g., S-NSSAI or NSSAI), along with other information. The SMF receives a PDU session resource setup response message (block 1107). The PDU session resource setup response message may be received from the gNB (by way of the AMF that is serving as proxy). The PDU session resource setup response message includes the IP address of the gNB, along with other information. The SMF now has knowledge of the IP address of the gNB. The PDU session resource setup response message may serve as an implicit response indicating the establishment of the path from the gNB to the UPF.

The SMF optionally performs admission control (block 1109). In admission control, the SMF (along with the TNF-FE and the TNF-BE) determines if the path will be permitted. The acceptance of the path may be dependent upon factors such as transport network load, transport network conditions, and so on.

The SMF sends a PFCP session establish request message with FAR (block 1111). The PFCP session establish request message with FAR may be sent to the UPF. The PFCP session establish request message with FAR may include the IP address of the gNB and the 3GPP network slice information, along with other information. The SMF receives a PFCP session establish response message (block 1113). The PFCP session establish response message may be received from the UPF. The PFCP session establish response message may serve as an implicit response indicating the establishment of the path from the UPF to the gNB.

FIG. 11B illustrates a flow diagram of example operations 1120 occurring in a gNB participating in the provisioning PDU resources for a UE session. Operations 1120 may be indicative of operations occurring in a gNB as the gNB participates in the provisioning of PDU resources for a UE session.

Operations 1120 begin with the gNB receiving a PDU session resource setup request message (block 1125). The PDU session resource setup request message may be received from the SMF (by way of the AMF serving as proxy). The gNB sends a translate-request message (block 1127). The translate-request message may be sent to a TNF-BE. The translate-request message includes the 3GPP network slice information, the source address (IP-g), the destination address (IP-u), and path parameters. The translate-request message may also include a subscribe option indicating that the gNB is to cache the MTNC-ID translation locally. The gNB receives a translate-response message (block 1129). The translate-response message may be received from the TNF-BE. The translate-response message includes the MTNC-ID (or a source port mapped from the MTNC-ID). The translate-response message may also include a duration value indicating how long the gNB can cache the MTNC-ID. If the translate-response message included the MTNC-ID, the gNB may perform MTNC-ID to source port mapping (block 1131). The gNB sends a PDU session resource setup response message (block 1133). The PDU session resource setup response message may be sent to the SMF (with the AMF serving as proxy). The PDU session resource setup response message may include the IP address of the gNB (IP-g), along with other information.

FIG. 11C illustrates a flow diagram of example operations 1140 occurring in a UPF participating in the provisioning resources for a UE session. Operations 1140 may be indicative of operations occurring in a UPF as the UPF participates in the provisioning of resources for a UE session.

Operations 1140 begin with the UPF receiving a PFCP session establish request message (block 1145). The PFCP session establish request message may be received from the SMF. The UPF sends a translate-request message (block 1147). The translate-request message may be sent to a TNF-BE. The translate-request message includes the 3GPP network slice information, the source address (IP-u), the destination address (IP-g), and path parameters. The translate-request message may also include a subscribe option indicating that the UPF is to cache the MTNC-ID translation locally. The UPF receives a translate-response message (block 1149). The translate-response message may be received from the TNF-BE. The translate-response message includes the MTNC-ID (or a source port mapped from the MTNC-ID). The translate-response message may also include a duration value indicating how long the UPF can cache the MTNC-ID. If the translate-response message included the MTNC-ID, the UPF may perform MTNC-ID to source port mapping (block 1151). The UPF sends a PFCP session establish response message (block 1153). The PFCP session establish response message may be sent to the SMF. The session resource setup response message may be an implicit indicator that the path from UPF to gNB has been established.

FIG. 11D illustrates a flow diagram of example operations 1160 occurring in a TNF-FE participating in the provisioning PDU resources for a UE session. Operations 1160 may be indicative of operations occurring in a TNF-FE as the TNF-FE participates in the provisioning of PDU resources for a UE session. The TNF-FE may be implemented in the gNB, SMF, or UPF. The TNF-FE, which may be co-located with the gNB, SMF, or UPF, may be initiated by a function call from the gNB, SMF, or UPF. Once the TNF-FE completes its work, another function call can return the results to the gNB, SMF, or UPF that initiated the TNF-FE.

Operations 1160 begin with the TNF-FE sending a translate-request message (block 1165). The translate-request message may be sent to a TNF-BE. The translate-request message includes the 3GPP network slice information, the source address (IP-g), the destination address (IP-u), and path parameters. The translate-request message may also include a subscribe option indicating that the TNF-FE is to cache the MTNC-ID translation locally. The TNF-FE receives a translate-response message (block 1167). The translate-response message may be received from the TNF-BE. The translate-response message includes the MTNC-ID (or a source port mapped from the MTNC-ID). The translate-response message may also include a duration value indicating how long the TNF-FE can cache the MTNC-ID.

If the translate-response message included the MTNC-ID, the TNF-FE may perform MTNC-ID to source port mapping (block 1169).

FIG. 11E illustrates a flow diagram of example operations 1180 occurring in a TNF-BE participating in the provisioning PDU resources for a UE session. Operations 1180 may be indicative of operations occurring in a TNF-BE as the TNF-BE participates in the provisioning of PDU resources for a UE session.

Operations 1180 begin with the TNF-FE receiving a translate-request message (block 1185). The translate-request message may be received from TNF-FE co-located in a gNB, SMF, or UPF. From the TNF-FE co-located in the gNB, the translate-request message includes the 3GPP network slice information, the source address (IP-g), the destination address (IP-u), and path parameters. The translate-request message may also include a subscribe option indicating that the gNB is to cache the MTNC-ID translation locally. From the TNF-FE co-located in the UPF, the translate-request message includes the 3GPP network slice information, the source address (IP-u), the destination address (IP-g), and path parameters. The translate-request message may also include a subscribe option indicating that the UPF is to cache the MTNC-ID translation locally.

The TNF-BE translates the 3GPP network slice information to an MTNC-ID (block 1187). The translation may be performed by the TNF-BE searching a translation table for the 3GPP network slice information, and if the 3GPP network slice information is present in the translation table, the TNF-BE retrieves the corresponding MTNC-ID. If the 3GPP network slice information is not present in the translation table, the TNF-BE may perform TE and provision an MTNC-ID for the 3GPP network slice information and associated path characteristics. The TNF-BE may perform MTNC-ID to source port mapping (block 1151).

The TNF-BE sends a translate-response message (block 1191). The translate-response message may be sent to the TNF-FE co-located in a gNB, SMF, or UPF (which ever TNF-FE originated the translate-request message). The translate-response message includes the MTNC-ID (or a source port mapped from the MTNC-ID). The translate-response message may also include a duration value indicating how long the gNB or the UPF can cache the MTNC-ID.

Figure 12:
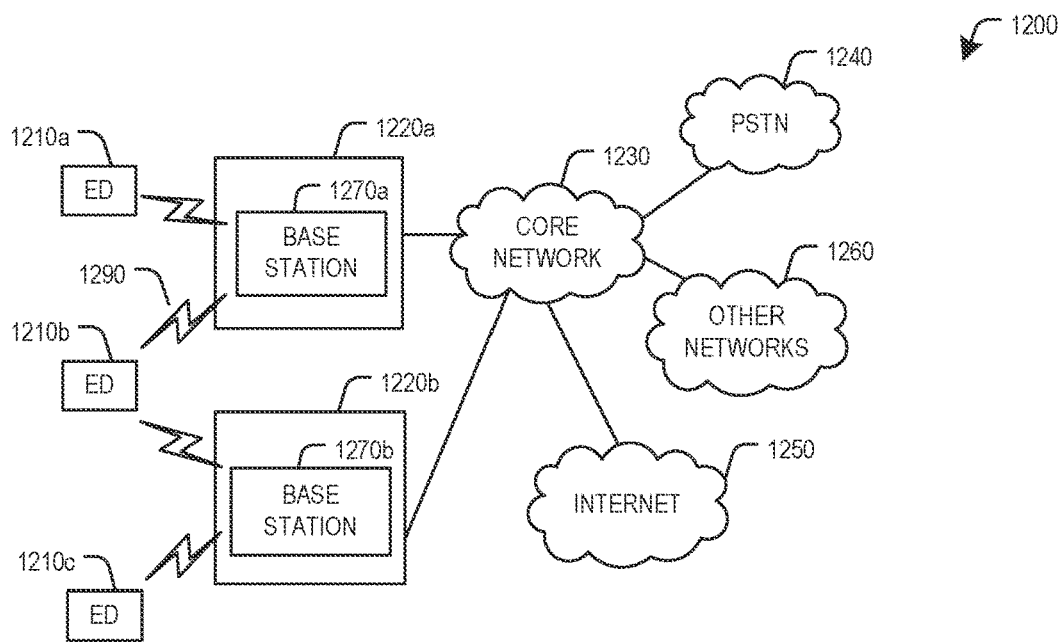
FIG. 12 illustrates an example communication system according to example embodiments presented herein.

FIG. 12 illustrates an example communication system 1200. In general, the system 1200 enables multiple wireless or wired users to transmit and receive data and other content. The system 1200 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1200 includes electronic devices (ED) 1210a-1210c, radio access networks (RANs) 1220a-1220b, a core network 1230, a public switched telephone network (PSTN) 1240, the Internet 1250, and other networks 1260. While certain numbers of these components or elements are shown in FIG. 12, any number of these components or elements may be included in the system 1200.

The EDs 1210a-1210c are configured to operate or communicate in the system 1200. For example, the EDs 1210a-1210c are configured to transmit or receive via wireless or wired communication channels. Each ED 1210a-1210c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1220a-1220b here include base stations 1270a-1270b, respectively. Each base station 1270a-1270b is configured to wirelessly interface with one or more of the EDs 1210a-1210c to enable access to the core network 1230, the PSTN 1240, the Internet 1250, or the other networks 1260. For example, the base stations 1270a-1270b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1210a-1210c are configured to interface and communicate with the Internet 1250 and may access the core network 1230, the PSTN 1240, or the other networks 1260.

In the embodiment shown in FIG. 12, the base station 1270a forms part of the RAN 1220a, which may include other base stations, elements, or devices. Also, the base station 1270b forms part of the RAN 1220b, which may include other base stations, elements, or devices. Each base station 1270a-1270b operates to transmit or receive wireless signals within a particular geographic region or area, sometimes referred to as a "cell." In some embodiments, multiple-input multiple-output (MIMO) technology may be employed having multiple transceivers for each cell.

The base stations 1270a-1270b communicate with one or more of the EDs 1210a-1210c over one or more air interfaces 1290 using wireless communication links. The air interfaces 1290 may utilize any suitable radio access technology.

It is contemplated that the system 1200 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1220a-1220b are in communication with the core network 1230 to provide the EDs 1210a-1210c with voice, data, application, Voice over Internet Protocol (VoIP), or other services. Understandably, the RANs 1220a-1220b or the core network 1230 may be in direct or indirect communication with one or more other RANs (not shown). The core network 1230 may also serve as a gateway access for other networks (such as the PSTN 1240, the Internet 1250, and the other networks 1260). In addition, some or all of the EDs 1210a-1210c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1250.

Although FIG. 12 illustrates one example of a communication system, various changes may be made to FIG. 12. For example, the communication system 1200 could include any number of EDs, base stations, networks, or other components in any suitable configuration.

Figure 13A:
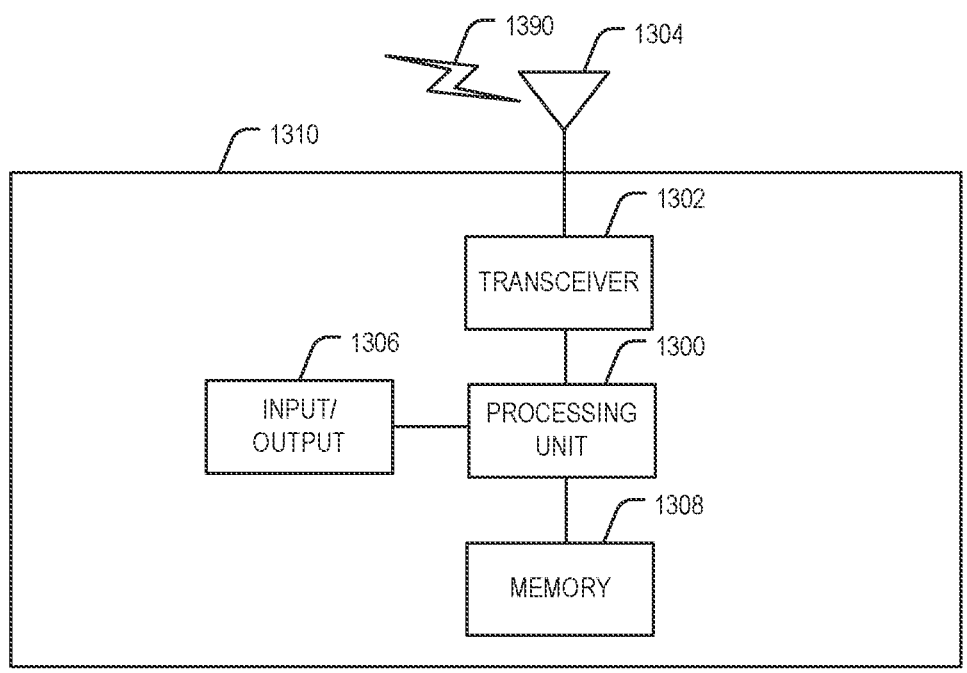
FIGS. 13A and 13B illustrate example devices that may implement the methods and teachings according to this disclosure.
Figure 13B:
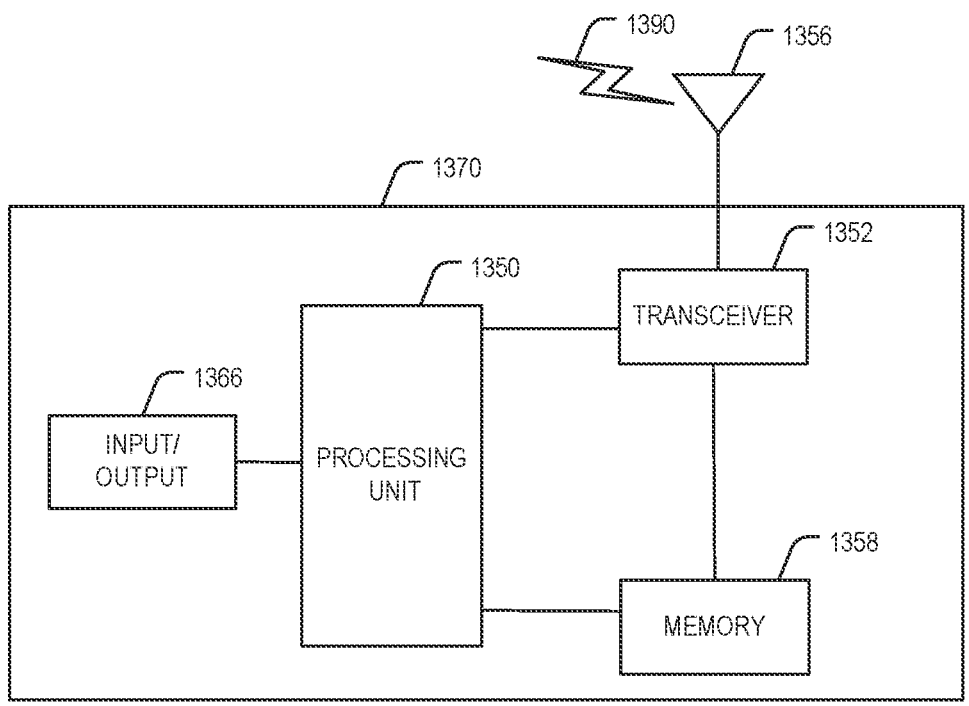

FIGS. 13A and 13B illustrate example devices that may implement the methods and teachings according to this disclosure. In particular, FIG. 13A illustrates an example ED 1310, and FIG. 13B illustrates an example base station 1370. These components could be used in the system 1200 or in any other suitable system.

As shown in FIG. 13A, the ED 1310 includes at least one processing unit 1300. The processing unit 1300 implements various processing operations of the ED 1310. For example, the processing unit 1300 could perform signal coding, data processing, power control, input/output processing, or any other functionality enabling the ED 1310 to operate in the system 1200. The processing unit 1300 also supports the methods and teachings described in more detail above. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The ED 1310 also includes at least one transceiver 1302. The transceiver 1302 is configured to modulate data or other content for transmission by at least one antenna or NIC (Network Interface Controller) 1304. The transceiver 1302 is also configured to demodulate data or other content received by the at least one antenna 1304. Each transceiver 1302 includes any suitable structure for generating signals for wireless or wired transmission or processing signals received wirelessly or by wire. Each antenna 1304 includes any suitable structure for transmitting or receiving wireless or wired signals. One or multiple transceivers 1302 could be used in the ED 1310, and one or multiple antennas 1304 could be used in the ED 1310. Although shown as a single functional unit, a transceiver 1302 could also be implemented using at least one transmitter and at least one separate receiver.

The ED 1310 further includes one or more input/output devices 1306 or interfaces (such as a wired interface to the Internet 1250). The input/output devices 1306 facilitate interaction with a user or other devices (network communications) in the network. Each input/output device 1306 includes any suitable structure for providing information to or receiving information from a user, such as a speaker, microphone, keypad, keyboard, display, or touch screen, including network interface communications.

In addition, the ED 1310 includes at least one memory 1308. The memory 1308 stores instructions and data used, generated, or collected by the ED 1310. For example, the memory 1308 could store software or firmware instructions executed by the processing unit(s) 1300 and data used to reduce or eliminate interference in incoming signals. Each memory 1308 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 13B, the base station 1370 includes at least one processing unit 1350, at least one transceiver 1352, which includes functionality for a transmitter and a receiver, one or more antennas 1356, at least one memory 1358, and one or more input/output devices or interfaces 1366. A scheduler, which would be understood by one skilled in the art, is coupled to the processing unit 1350. The scheduler could be included within or operated separately from the base station 1370. The processing unit 1350 implements various processing operations of the base station 1370, such as signal coding, data processing, power control, input/output processing, or any other functionality. The processing unit 1350 can also support the methods and teachings described in more detail above. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

Each transceiver 1352 includes any suitable structure for generating signals for wireless or wired transmission to one or more EDs or other devices. Each transceiver 1352 further includes any suitable structure for processing signals received wirelessly or by wire from one or more EDs or other devices. Although shown combined as a transceiver 1352, a transmitter and a receiver could be separate components. Each antenna 1356 includes any suitable structure for transmitting or receiving wireless or wired signals. While a common antenna 1356 is shown here as being coupled to the transceiver 1352, one or more antennas 1356 could be coupled to the transceiver(s) 1352, allowing separate antennas 1356 to be coupled to the transmitter and the receiver if equipped as separate components. Each memory 1358 includes any suitable volatile or non-volatile storage and retrieval device(s). Each input/output device 1366 facilitates interaction with a user or other devices (network communications) in the network. Each input/output device 1366 includes any suitable structure for providing information to or receiving/providing information from a user, including network interface communications.

Figure 14:
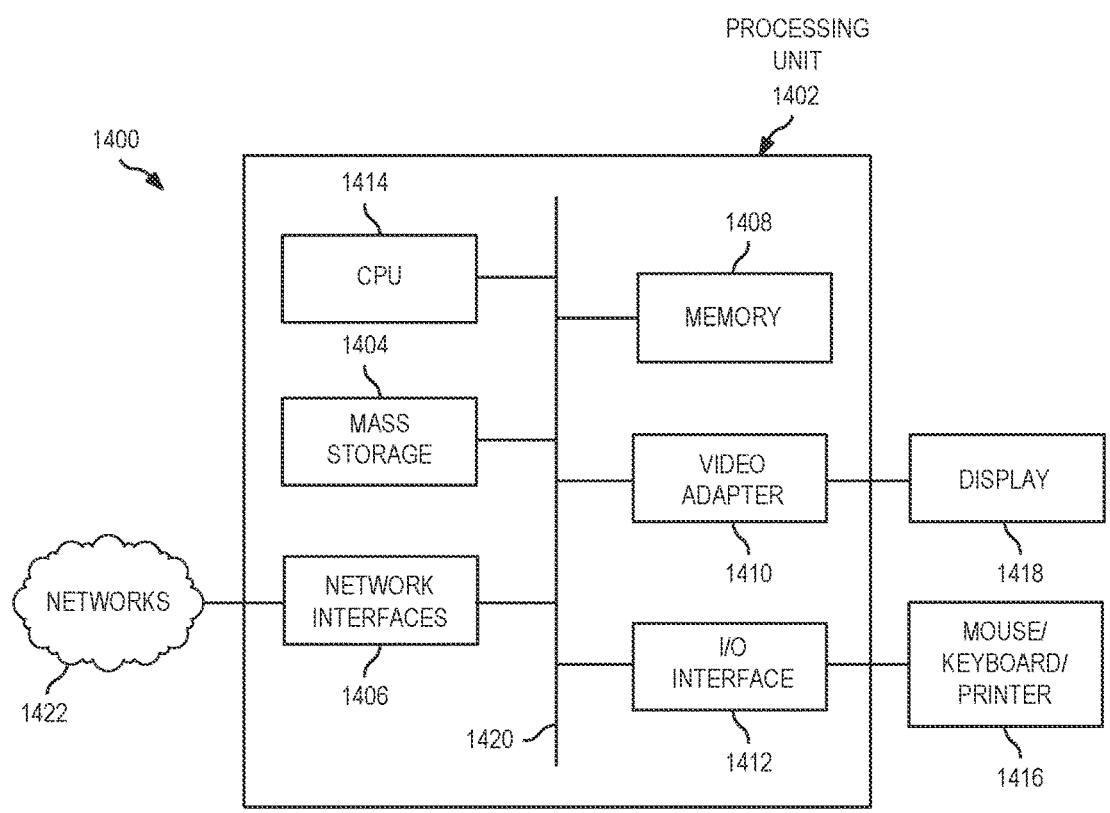
FIG. 14 is a block diagram of a computing system that may be used for implementing the devices and methods disclosed herein.

FIG. 14 is a block diagram of a computing system 1400 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1400 includes a processing unit 1402. The processing unit includes a central processing unit (CPU) 1414, memory 1408, and may further include a mass storage device 1404, a video adapter 1410, and an I/O interface 1412 connected to a bus 1420.

The bus 1420 may be one or more of any type of several bus architectures including a memory bus or memory controller, a peripheral bus, or a video bus. The CPU 1414 may comprise any type of electronic data processor. The memory 1408 may comprise any type of non-transitory system memory such as static random access memory (SRAM), dynamic random access memory (DRAM), synchronous DRAM (SDRAM), read-only memory (ROM), or a combination thereof. In an embodiment, the memory 1408 may include ROM for use at boot-up, and DRAM for program and data storage for use while executing programs.

The mass storage 1404 may comprise any type of non-transitory storage device configured to store data, programs, and other information and to make the data, programs, and other information accessible via the bus 1420. The mass storage 1404 may comprise, for example, one or more of a solid state drive, hard disk drive, a magnetic disk drive, or an optical disk drive.

The video adapter 1410 and the I/O interface 1412 provide interfaces to couple external input and output devices to the processing unit 1402. As illustrated, examples of input and output devices include a display 1418 coupled to the video adapter 1410 and a mouse, keyboard, or printer 1416 coupled to the I/O interface 1412. Other devices may be coupled to the processing unit 1402, and additional or fewer interface cards may be utilized. For example, a serial interface such as Universal Serial Bus (USB) (not shown) may be used to provide an interface for an external device.

The processing unit 1402 also includes one or more network interfaces 1406, which may comprise wired links, such as an Ethernet cable, or wireless links to access nodes or different networks. The network interfaces 1406 allow the processing unit 1402 to communicate with remote units via the networks. For example, the network interfaces 1406 may provide wireless communication via one or more transmitters/transmit antennas and one or more receivers/receive antennas. In an embodiment, the processing unit 1402 is coupled to a local-area network 1422 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a selecting unit or module, or a mapping unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:
   receiving, by a network function entity from a front end entity, a translation request indicating network slice selection assistance information (S-NSSAI), a first transport interface address, a second transport interface address, a user datagram protocol (UDP) source port, and one or more quality of service (QoS) parameters associated with a transport path between a first user plane entiry (UPE) and a second UPE; and
   sending, by the network function entity to the front end entity, a translation response comprising an indicator indicating an identifier of the transport path, the identifier being based on one of:
   (1) the first transport interface address, the second transport interface address, the S-NSSAI, and the one or more QoS parameters, or
   (2) the first transport interface address, the second transport interface address, and the UDP source port.

2. The method of claim 1, wherein the indicator comprises the identifier of the transport path.

3. The method of claim 1, wherein the indicator further indicates the UDP source port.

4. The method of claim 3, further comprising:
   mapping, by the network function entity, the identifier of the transport path to the UDP source port in accordance with a mapping function, the mapping function distributing the identifier of the transport path to one of a plurality of UDP source port ranges to balance network load.

5. The method of claim 1, wherein the translation response further indicates a duration time value specifying a validity interval associated with the identifier.

6. The method of claim 1, wherein the first UPE is an access node, the first transport interface address comprises a first Internet Protocol (IP) address of the access node, the second transport interface address comprises a second IP address of the second UPE, and the translation response is sent to the access node.

7. The method of claim 1, wherein the second UPE is an access node, the first transport interface address comprises a first IP address of the first UPE, the second transport interface address comprises a second IP address of the access node, and the translation response is sent to the first UPE.

8. The method of claim 1, wherein the translation request further comprises a subscription indicator.

9. The method of claim 1, wherein the one or more QoS parameters comprise at least one of a path bandwidth, a path latency, a path priority, or a path protection.

10. The method of claim 1, wherein the network function entity comprises a transport network function entity.

11. The method of claim 1, wherein the front end entity comprises a transport network function front end entity.

12. A network function entity comprising:
    one or more processors; and
    a non-transitory memory storage storing instructions that, when executed by the one or more processors, cause the network function entity to perform operations including:
    receiving, from a front end entity, a translation request indicating network slice selection assistance information (S-NSSAI), a first transport interface address, a second transport interface address, a user datagram protocol (UDP) source port, and one or more quality of service (QoS) parameters associated with a transport path between a first user plane entity (UPE) and a second UPE; and
    sending, to the front end entity, a translation response comprising an indicator indicating an identifier of the transport path, the identifier being based on one of:
    (1) the first transport interface address, the second transport interface address, the S-NSSAI, and the one or more QoS parameters, or
    (2) the first transport interface address, the second transport interface address, and the UDP source port.

13. The network function entity of claim 12, wherein the indicator comprises the identifier of the transport path.

14. The network function entity of claim 12, wherein the indicator further indicates the UDP source port.

15. The network function entity of claim 14, the operations further comprising:
    mapping the identifier of the transport path to the UDP source port in accordance with a mapping function, the mapping function distributing the identifier of the transport path to one of a plurality of UDP source port ranges to balance network load.

16. The network function entity of claim 12, wherein the first UPE is an access node, the first transport interface address comprises a first Internet Protocol (IP) address of the access node, the second transport interface address comprises a second IP address of the second UPE, and the translation response is sent to the access node.

17. The network function entity of claim 12, wherein the second UPE is an access node, the first transport interface address comprises a first IP address of the first UPE, the second transport interface address comprises a second IP address of the access node, and the translation response is sent to the first UPE.

18. The network function entity of claim 12, wherein the translation request further comprises a subscription indicator.

19. The network function entity of claim 12, wherein the one or more QoS parameters comprise at least one of a path bandwidth, a path latency, a path priority, or a path protection.

20. The network function entity of claim 12, wherein the translation response further indicates a duration time value specifying a validity interval associated with the identifier.

21. The network function entity of claim 12, wherein the network function entity comprises a transport network function entity.

22. The network function entity of claim 12, wherein the front end entity comprises a transport network function front end entity.

23. A method comprising:
sending, by a front end entity to a network function entity, a translation request indicating network slice selection assistance information (S-NSSAI), a first transport interface address, a second transport interface address, a user datagram protocol (UDP) source port, and one or more quality of service (QoS) parameters associated with a transport path between a first user plane entity (UPE) and a second UPE; and
receiving, by the front end entity from the network function entity, a translation response comprising an indicator indicating an identifier of the transport path, the identifier being based on one of:
(1) the first transport interface address, the second transport interface address, the S-NSSAI, and the one or more QoS parameters, or
(2) the first transport interface address, the second transport interface address, and the UDP source port.

24. The method of claim 23, wherein the indicator comprises the identifier of the transport path.

25. The method of claim 23, wherein the indicator further indicates the UDP source port.

26. The method of claim 23, wherein the translation response further indicates a duration time value specifying a validity interval associated with the identifier.

27. A front end entity comprising:
one or more processors; and
a non-transitory memory storage storing instructions that, when executed by the one or more processors, cause the front end entity to perform operations including:
sending, to a network function entity, a translation request indicating network slice selection assistance information (S-NSSAI), a first transport interface address, a second transport interface address, and one or more quality of service (QoS) parameters associated with a transport path between a first user plane entity (UPE) and a second UPE; and
receiving, from the network function entity, a translation response comprising an indicator indicating an identifier of the transport path, the identifier being based on the S-NSSAI, the first transport interface address, and the second transport interface address.

28. The front end entity of claim 27, wherein the indicator comprises the identifier of the transport path.

29. The front end entity of claim 27, wherein the indicator further indicates a user datagram protocol (UDP) source port.

30. The front end entity of claim 27, wherein the translation response further indicates a duration time value specifying a validity interval associated with the identifier.

\* \* \* \* \*

UNITED STATES PATENT AND TRADEMARK OFFICE
CERTIFICATE OF CORRECTION

PATENT NO. : 12,376,017 B2
APPLICATION NO. : 17/728429
DATED : July 29, 2025
INVENTOR(S) : John et al.

Page 1 of 1

It is certified that error appears in the above-identified patent and that said Letters Patent is hereby corrected as shown below:

In the Claims

In Column 25, in Claim 1, Line 44, delete "entiry" and insert -- entity --.

Signed and Sealed this
Second Day of September, 2025

Coke Morgan Stewart
*Acting Director of the United States Patent and Trademark Office*